(12) United States Patent
Umezawa-san et al.

(10) Patent No.: US 7,765,270 B2
(45) Date of Patent: Jul. 27, 2010

(54) MUSIC PLAYER

(75) Inventors: Satoru Umezawa-san, Shizuoka-ken (JP); Motoaki Miyabe-san, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 579 days.

(21) Appl. No.: 11/389,457

(22) Filed: Mar. 24, 2006

(65) Prior Publication Data
US 2006/0217829 A1 Sep. 28, 2006

(30) Foreign Application Priority Data
Mar. 25, 2005 (JP) .............................. 2005-087610

(51) Int. Cl.
G06F 15/16 (2006.01)
H04H 40/00 (2008.01)

(52) U.S. Cl. ........................ 709/216; 709/202; 709/218; 709/227; 455/3.06

(58) Field of Classification Search ......... 709/204–208, 709/230–231, 212–216, 201, 202, 217–219, 709/227–229; 370/431–432, 259–262; 455/405, 455/3.01, 3.06
See application file for complete search history.

(56) References Cited

U.S. PATENT DOCUMENTS

| | | | | |
|---|---|---|---|---|
| 6,555,738 | B2* | 4/2003 | Hughes et al. | 84/609 |
| 6,661,496 | B2* | 12/2003 | Sherman et al. | 352/6 |
| 6,670,537 | B2* | 12/2003 | Hughes et al. | 84/609 |
| 7,000,081 | B2* | 2/2006 | Hooker | 711/143 |
| 7,237,268 | B2* | 6/2007 | Fields | 726/27 |
| 7,400,819 | B2* | 7/2008 | Tagawa et al. | 386/95 |
| 2001/0049641 | A1 | 12/2001 | Nakamura et al. | |
| 2004/0014454 | A1* | 1/2004 | Burgess et al. | 455/405 |
| 2004/0199525 | A1 | 10/2004 | Matsuda et al. | |
| 2005/0044223 | A1* | 2/2005 | Meyerson | 709/225 |
| 2005/0160270 | A1* | 7/2005 | Goldberg et al. | 713/176 |
| 2005/0165941 | A1* | 7/2005 | Eytchison et al. | 709/231 |
| 2005/0198681 | A1* | 9/2005 | Park | 725/89 |
| 2005/0286546 | A1* | 12/2005 | Bassoli et al. | 370/432 |
| 2006/0008256 | A1* | 1/2006 | Khedouri et al. | 386/124 |

(Continued)

FOREIGN PATENT DOCUMENTS

JP 2001-333033 11/2001

(Continued)

OTHER PUBLICATIONS

The Authoritative Dictionary of IEEE Standard Terms. 7th ed. 2000.*

*Primary Examiner*—Philip J Chea
*Assistant Examiner*—Brendan Higa
(74) *Attorney, Agent, or Firm*—Harness, Dickey & Pierce, PLC

(57) ABSTRACT

A portable music player downloads a musical composition data from a distribution server. When this musical composition data is played back, a sample musical composition data composing a part of the musical composition data is distributed to a surrounding player by wireless. At this time, a terminal identification number IDa of the supplier player is included in tag information of the sample musical composition data, and the user of the surrounding player can download the musical composition data related to the sample musical composition data for value from the distribution server. A part of its sold price is refunded to the user of the supplier player.

10 Claims, 15 Drawing Sheets

U.S. PATENT DOCUMENTS

| | | | |
|---|---|---|---|
| 2006/0190968 A1* | 8/2006 | Jung et al. | 725/74 |
| 2006/0259434 A1* | 11/2006 | Vilcauskas et al. | 705/57 |
| 2007/0129006 A1* | 6/2007 | Goldberg et al. | 455/3.06 |
| 2007/0161390 A1 | 7/2007 | Matsuda et al. | |
| 2007/0186003 A1* | 8/2007 | Foster et al. | 709/231 |
| 2007/0281667 A1* | 12/2007 | Minor | 455/414.1 |
| 2008/0134264 A1* | 6/2008 | Narendra et al. | 725/110 |
| 2009/0042622 A1* | 2/2009 | Tsui et al. | 455/567 |

FOREIGN PATENT DOCUMENTS

| | | |
|---|---|---|
| JP | 2001-350479 | 12/2001 |
| JP | 2002-185612 | 6/2002 |
| JP | 2003-150681 | 5/2003 |
| JP | 2003-271766 | 9/2003 |
| JP | 2004-054023 | 2/2004 |
| JP | 2004-538551 | 12/2004 |

* cited by examiner

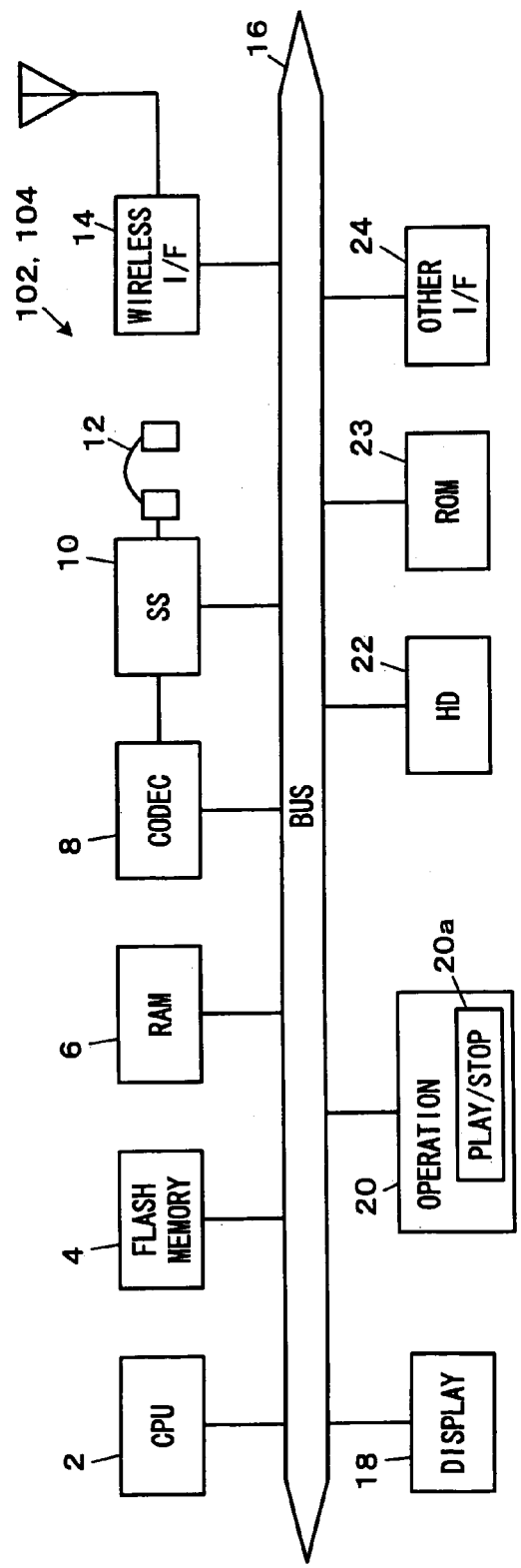
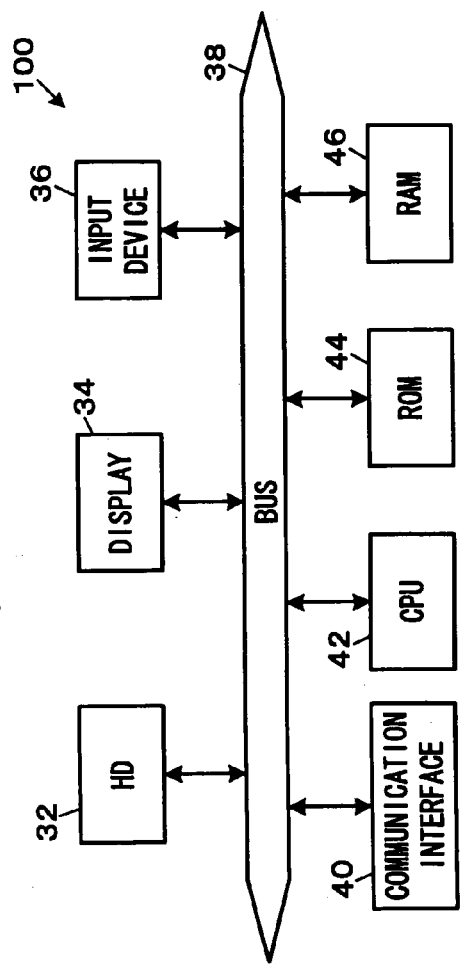

F I G. 1 2
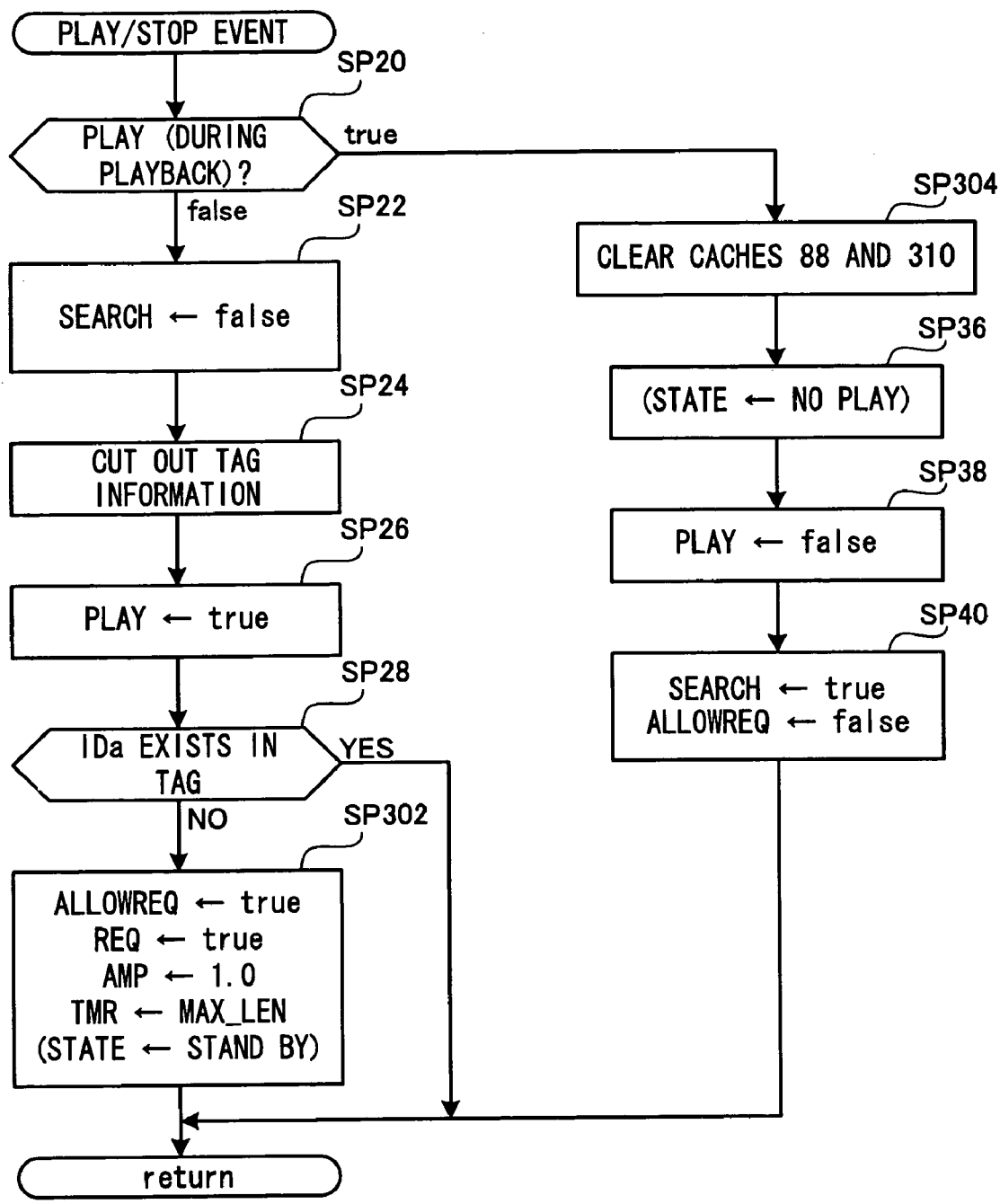

MUSIC PLAYER

BACKGROUND OF THE INVENTION

1. Field of the Invention

The present invention relates to a music player -and program suitable for use in a portable music player.

2. Description of the Related Art

Conventionally, a portable music player playing back a musical composition file in MP3 format or the like is known. The player of this type is capable of downloading a variety of musical composition files via a kiosk terminal, storing them in its built-in hard disk or the like, and playing back them. Further, a system distributing content such as music in a train is disclosed in Japanese Patent Application Laid-Open No. 2003-150681. The content to be distributed is the one previously prepared by the operator of the system. Further, in Japanese Patent Application Laid-Open No. 2002-185612, a technology to distribute information to a personal digital assistant is disclosed. This is to distribute various contents to the personal digital assistant existing in a hot spot.

SUMMARY OF THE INVENTION

However, according to the technology disclosed in Japanese Patent Application Laid-Open No. 2003-150681, it is possible to distribute FM broadcast or musical composition data in the train. However, there is a problem of lacking off-center since the data is distributed simply under predetermined program. On the other hand, when an ordinary user tries to collect musical composition data during playback by the portable music player or the like and to distribute it to the other passenger, there arises a problem of requiring a large facility. Further, generally, the passengers get on and off the train frequently, so that renewal of the data to be stored requires constant management.

Further, in the technology related to Japanese Patent Application Laid-Open No. 2003-150681, the respective passengers have to select their desired contents one by one from the facility of the train in any way, making the operation be troublesome.

Further, when the distribution, receipt and playback of the sound data are allowed between the ordinary users, it is extremely difficult to recognize the royalties of the copyrighted works, causing a problem as strong possibility that the rights of the copyright holders of the musical compositions are not protected at all.

The present invention has been made in view of the above-described circumstances, and a first object thereof is to provide a music player and program capable of distributing sound data having sound quality worthy of listening to those other than the user of the music player playing back musical composition data with simple configuration. Further, a second object thereof is to protect copyright of the musical composition data and the like.

In order to bring a solution to the previously-described problems, the present invention has the following structure. Note that the parenthetical references are exemplifications.

A music player according to the present invention includes: an identification number memory (23) storing a unique identification number (IDa, IDb); a musical composition data memory (22) storing one or more musical composition data; a player (8) reading out and playing back the musical composition data; a cache memory (88) storing sound data composing a part of the musical composition data during playback by the player (8); a sound data sender (14, SP158) sending the identification number (IDa, IDb) and the sound data to an other music player when receiving a musical composition supply request (SP182) from the other music player; a musical composition supply request sender (14, SP182) sending the musical composition supply request to the other music player; and a sound data memory (22, 306, SP190) storing the sound data supplied by the other music player in response to the musical composition supply request.

Further, it is preferable to provide such the music player with a sound data clearing device (SP34, SP304) that clears the sound data stored in the cache memory (88) when the playback of the sound data is stopped in the player (8).

Further, it is also preferable that the sound data sender (14, SP158) is a device that sends a musical composition data identification information (TAGs) identifying the musical composition data and the music player includes a musical composition data identification information sender sending the musical composition data identification information (TAGs) to a distribution device (100) supplying the musical composition data, a musical composition data receiver (14, SP212) receiving the musical composition data related to the musical composition data identification information (TAGs) from the distribution device (100), and a sound data clearing device (SP214) clearing the corresponding sound data in said sound data memory (22, 306) when receiving the musical composition data via the musical composition data receiver (14, SP212).

Further, a program according to the present invention is a computer program containing program instructions executable by a computer which controls a music player with an identification number memory (23) storing a unique identification number, a musical composition data memory (22) storing one or more musical composition data and a player (8) reading out and playing back the musical composition, data and causing said computer (2) to execute: a process of storing sound data composing a part of the musical composition data during playback by the player (8) into a cache memory(88); a sound data sending process (SP158) of sending the identification number (IDa, IDb) and the sound data to an other music player when receiving a musical composition supply request (SP182) from the other music player; a musical composition supply request sending process (SP182) of sending the musical composition supply request to the other music player; and a sound data storing process (SP190) of storing the sound data supplied from the other music player in response to the musical composition supply request.

The above and other objects, features and advantages of the invention will be apparent from the following detailed description which is to be read in conjunction with the accompanying drawings.

BRIEF DESCRIPTION OF THE DRAWINGS

FIGS. 2A and 2B are block diagrams showing a portable music player and a distribution server 100 of the first embodiment, respectively;

FIG. 12 is a flowchart showing a play/stop event process routine of the second embodiment;

DETAILED DESCRIPTION OF THE PREFERRED EMBODIMENTS

Hereinafter, the best mode for carrying out the invention will be concretely described with reference to the drawings.

1. Outline of Embodiments

First, outlines of later-described first and second embodiments will be described with reference to FIGS. 1A to 1D.

Figure 1A:
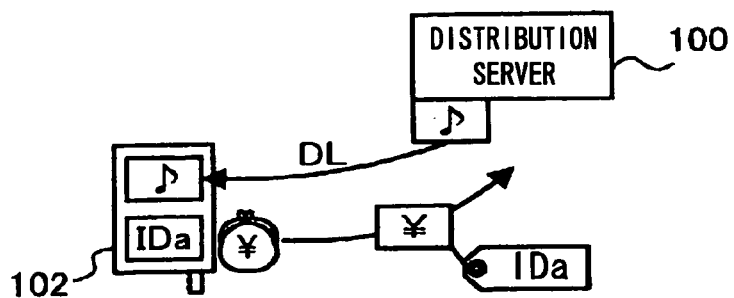
FIGS. 1A to 1D are views illustrating operations of a first embodiment according to the invention, respectively.
Figure 1B:
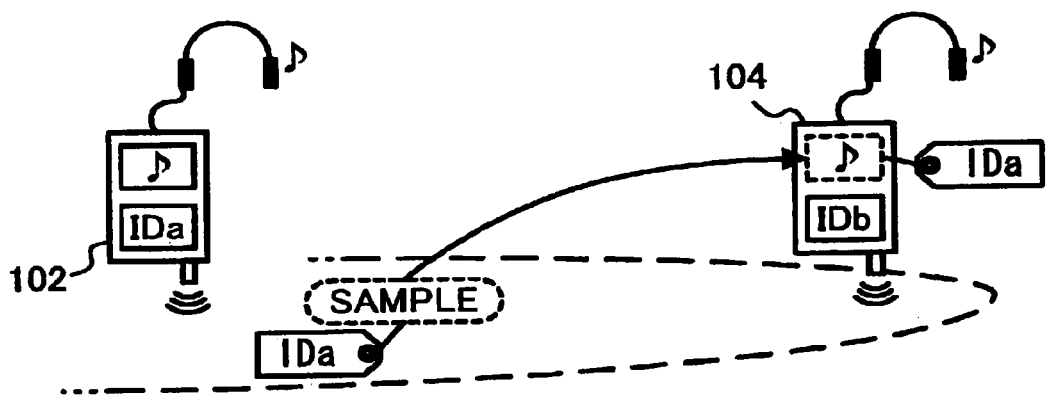
Figure 1C:
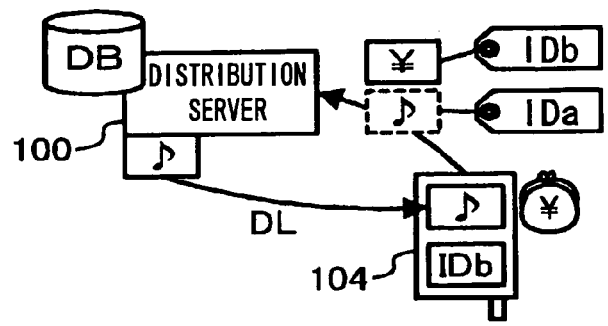
Figure 1D:
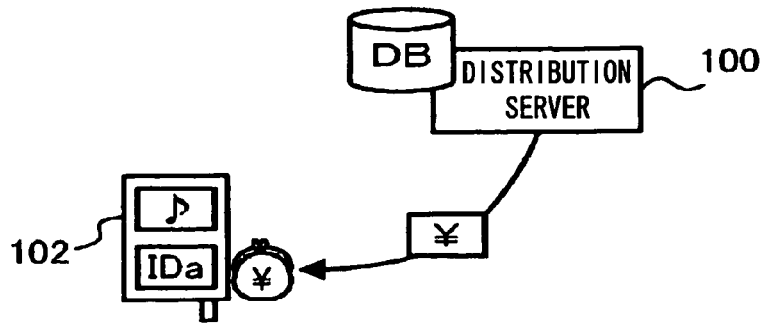

FIG. 1A is a view showing an operation in a case where a user A buys and downloads a musical composition file from a site. FIG. 1B is a view showing an operation in a case where the user A plays back the file to thereby supply a sample data to a neighboring area. FIG 1C is a view showing an operation in a case where a user B buys and downloads a musical composition file from a site. FIG 1D is a view showing a case where a distribution site adds a purchase point of the user A's player.

In FIG. 1A, "102" denotes a portable music player that can download non-free musical composition files from a distribution server 100. Plural kiosk terminals are connected to the distribution server 100 via a network, and the respective portable music players are to communicate with the distribution server 100 via one of the kiosk terminals. A kind of electronic money called a "purchase point" is used to settle the charge for the non-free musical composition data, and the respective users can buy a musical composition data by charging the purchase point to the player in advance.

The musical composition data is stored in each player as a musical composition file in MP3 format or the like. Each player has a unique identification number and the player 102 is given a terminal identification number IDa. Accordingly, in the distribution server 100, various user management processes are performed based on the terminal identification number IDa. Note that the identification number may be any information that can uniquely identify the portable music player, and, for example, MAC address of the player can be used.

Subsequently, in FIG. 1B, when the user A of the portable music player 102 actually plays back the musical composition file, then a sample musical composition data to be supplied to the other player free of charge is generated automatically based on the musical composition data. In tag information of this sample musical composition data, the terminal identification number IDa of the player 102 being its generator is recorded. At this moment, it is assumed that the another portable music player 104 comes close to the player 102. The portable music players can communicate with each other vie a wireless network, and the sample musical composition data is supplied to the player 104.

Subsequently, in FIG. 1C, when the user B of the portable music player 104 previews the sample musical composition data and, as a result, desires to buy the non-free musical composition data, then, the user B can download the non-free musical composition data from the distribution server 100. At that time, the terminal identification number IDa of the portable music player 102 being a supplier of the sample musical composition data will be noticed together with a terminal identification number IDb of the player 104 itself from the player 104 to the distribution server 100.

Subsequently, in FIG. 1D, a predetermined purchase point is added to the terminal identification number IDa as a consideration for a "sample musical composition data distribution". When the user A buys another musical composition data next time, the payment amount is reduced by the amount corresponding to this purchase point. Accordingly, the respective users become to cooperate with the distribution of the sample musical composition data positively.

2. First Embodiment

2.1. Hardware Configuration

First, the configuration of the portable music player will be described with reference to FIG. 2A.

"2" denotes a CPU that controls other components via a bus 16 based on a program (described in detail later) recorded in a flash memory 4. In the flash memory 4, information such as the purchase point is recorded in addition to the program. "6" denotes a RAM that is used as a working memory for the CPU 2. "8" denotes a CODEC that generates a musical composition data in the MP3 format by compressing an uncompressed sound signal, and obtains a musical composition signal in PCM format by decompressing the compressed musical composition data in the MP3 format. "10" denotes a sound system that converts the sound signal outputted from the CODEC 8 into an analog signal to thereby perform tone emission via a headphone 12.

"14" denotes a wireless interface being compliant to Bluetooth™, which performs two-way communication with other portable music players or kiosk terminals. "18" denotes a display that displays a variety of information to the user. "20" is an operation unit composed of various keys. Among others, a play/stop button 20a is provided in the operation unit 20. "22" denotes a hard disk that stores the musical composition file, sample musical composition file, and the like. "23" denotes a ROM that stores the terminal identification number of the player. "24" is the other interface that is connected to various other equipment as required and executes data communication.

Subsequently, the configuration of the distribution server 100 (or the kiosk terminal) will be described with reference to FIG. 2B. In the drawing, "32" denotes a hard disk in which operating system, various application programs, musical composition data, and the like are stored. "34" denotes a display that displays a variety of information to the user. "36" denotes input equipment composed of a text-input keyboard, mouse, and the like. "40" denotes a communication interface through which the distribution server 100 communicates with the kiosk terminal, and the kiosk terminal performs data communication between the portable music players and the distribution server 100, respectively. "42" denotes a CPU that controls the other components via a bus 38. "44" denotes a ROM in which initial program loader for the distribution server 100 (kiosk terminal) and the like are stored. "46" denotes a RAM that is used as a working memory for the CPU 42. Although the distribution server 100 and the kiosk terminal are independent computer equipment respectively, they serve as one distribution system by collaborating with each other via a not-shown communication network. Hereinafter, for convenience of explanation, the distribution system is called the distribution server 100.

2.2. Data Configuration

Figure 3:
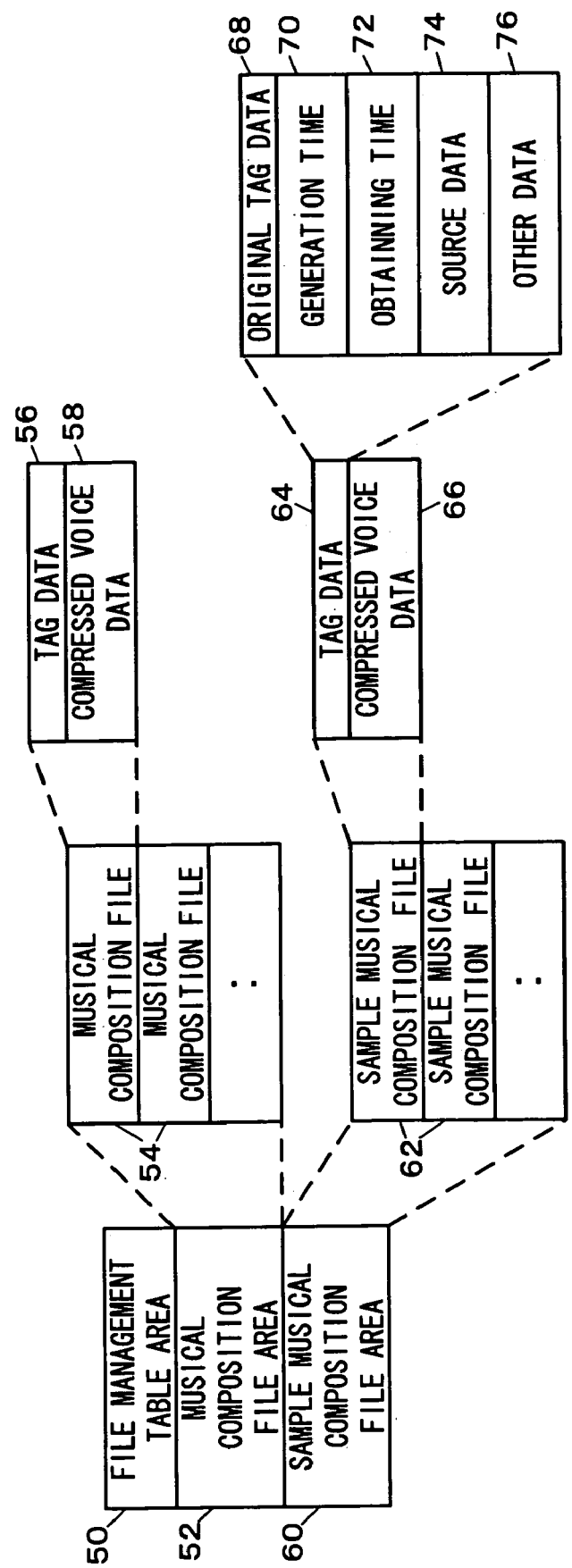
FIG. 3 is a memory map of a hard disk 22 of the first embodiment.

Subsequently, a memory map inside the hard disk 22 of the portable music player will be described with reference to FIG. 3.

In the drawing, the area in the hard disk 22 is composed of a file management table area 50, a musical composition file area 52 and a sample musical composition file area 60. Here, the musical composition file area 52 stores plural musical composition files 54, and the sample musical composition file area 60 stores plural sample musical composition files 62. The musical composition files 54 and 62 are both in the MP3 format, in which the musical composition files 54 are to be bought/sold for value (non-free) and the sample musical composition files 62 are to be distributed free of charge.

Each of the musical composition file 54 is composed of tag information 56 and compressed sound data 58. In similar fashion, each of the sample musical composition files 62 is composed of tag information 64 and compressed sound data 66. Here, the tag information includes an album title, copyright information, and the like related to the compressed sound data. The tag information 64 of the sample musical composition file 62 is composed of original tag information 68, generation time 70, acquisition time 72, supplier information 74 and other information 76. The sample musical composition file 62 is generated from the normal musical composition file 54 stored in the hard disk 22 of the other portable music player, and the original tag information 68 is equal to the tag information originally contained in the musical composition file. Also, the generation time 70 represents the time when the sample musical composition file is generated, and the acquisition time 72 represents the time when the portable music player acquired the sample musical composition file. Further, the supplier information 74 is the identification number of the portable music player that generates the sample musical composition data related to the sample musical composition file.

2.3. Configuration of CODEC

Figure 4:
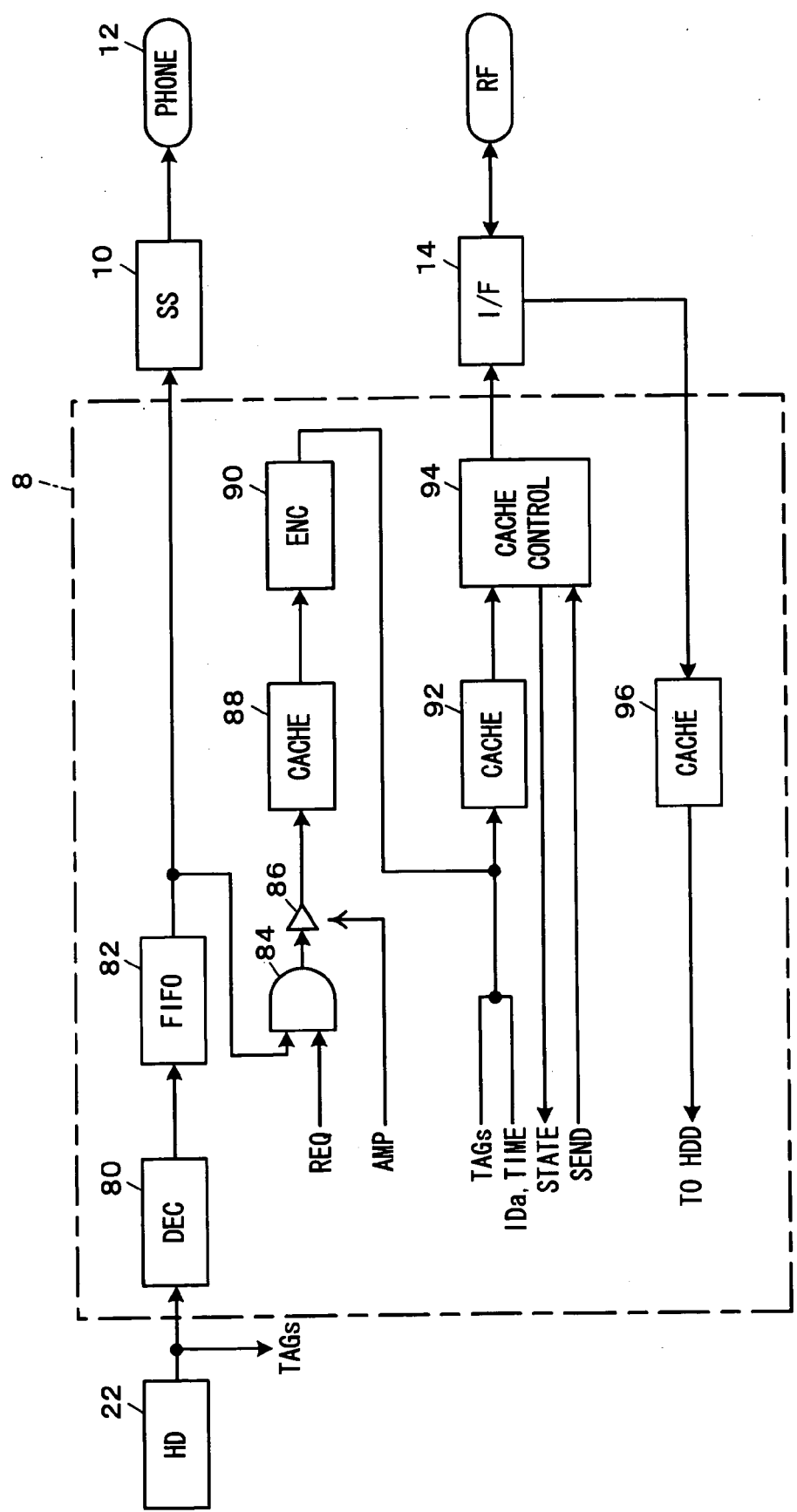
FIG. 4 is a block diagram showing functions of a CODEC 8 of the first embodiment.

Subsequently, detail configuration of the CODEC 8 will be described with reference to FIG. 4. In the drawing, "80" denotes a decoder that decodes the compressed sound data 58, 66 in the musical composition files 54 read out from the hard disk 22 and converts them into decompressed sound signals (PCM data). Note that the tag information 56 included in the musical composition files is read out by the CPU 2 to be additionally supplied to the CODEC 8 as original tag information TAGs. "82" denotes a FIFO buffer that receives the sound signal, and supplies its output signal to the sound system 10 and an input end of an AND circuit 84. Here, a signal, which will be described below, is supplied to the CODEC 8 by the CPU 2.

(1) Request flag REQ: this is set to "true" when the output signal of the FIFO buffer 82 is within the period to be included in the sample musical composition data. This is, for example, a time period of "30" seconds from the start time of the playback of the musical composition data. The request flag REQ is set to "false" when it is other than the period. Also, when the sample musical composition file 62 is during playback as a musical composition file, the request flag REQ is always set to "false".

(2) Volume coefficient AMP: this is a coefficient to determine volume of the sample musical composition data, and specifically is used to fade out the sample musical composition data from several seconds before the request flag REQ becomes "false".

(3) Original tag information TAGs: an original content of the tag information 56 of the musical composition file 54 read out from the hard disk 22 and during playback.

(4) Terminal identification number IDa: as previously described, this is a unique identification number of the portable music player.

(5) Sample musical composition data generation time TIME: the time when the sample musical composition data is generated. Note that the time information is acquired from a built-in clock of the CPU 2.

(6) Send flag SEND: this is set to "true" at the timing of sending the sample musical composition data to another portable music player after generating the sample musical composition data, and is set to "false" in the other period.

(7) Others: other than the above, for example, a signal to clear each cache memory or the like is sent from the CPU 2 to CODEC 8, as required.

When the playback position of the musical composition file comes to the position related to the sample musical composition data during the playback, the request flag REQ becomes "true", so that the sound signal to be outputted from the FIFO buffer 82 is outputted via the AND circuit 84. "86" denotes an amplifier that performs gain adjustment to the sound signal in accordance with the volume coefficient AMP. "88" denotes a cache memory that temporarily stores the sound signal after the gain adjustment. "90" denotes an encoder that performs compression process with respect to the sound signal in the cache memory 88.

"92" denotes a cache memory that stores the terminal identification number IDa, the sample musical composition data generation time TIME, and the original tag information TAGs received from the CPU 2, and also the compressed sound data outputted from the encoder 90 to thereby store a sample musical composition data being a combination of these. "94" denotes a cache control circuit that supplies the content of the cache memory 92 to the wireless interface 14 when the send flag SEND from the CPU 2 becomes "true". Also, the cache control circuit 94 returns any of the following cache states STATE to the CPU 2 as the state of the cache memory 92.

(1) NO PLAY: a state where no data is stored in the cache memory 92.

(2) READY: a state where the sample musical composition data is being generated.

(3) STAND BY: a state where the sample musical composition data is completed and can be sent.

Based on this, the sample musical composition data is sent to another portable music player. Also, the wireless interface 14 can receive the musical composition data, the sample musical composition data, and the like from another player or kiosk terminal. The data thus received is recorded in the cache memory 96 and then recorded in the hard disk 22.

2.4. Operation of First Embodiment

2.4.1. Process of Main Routine

Figure 5:
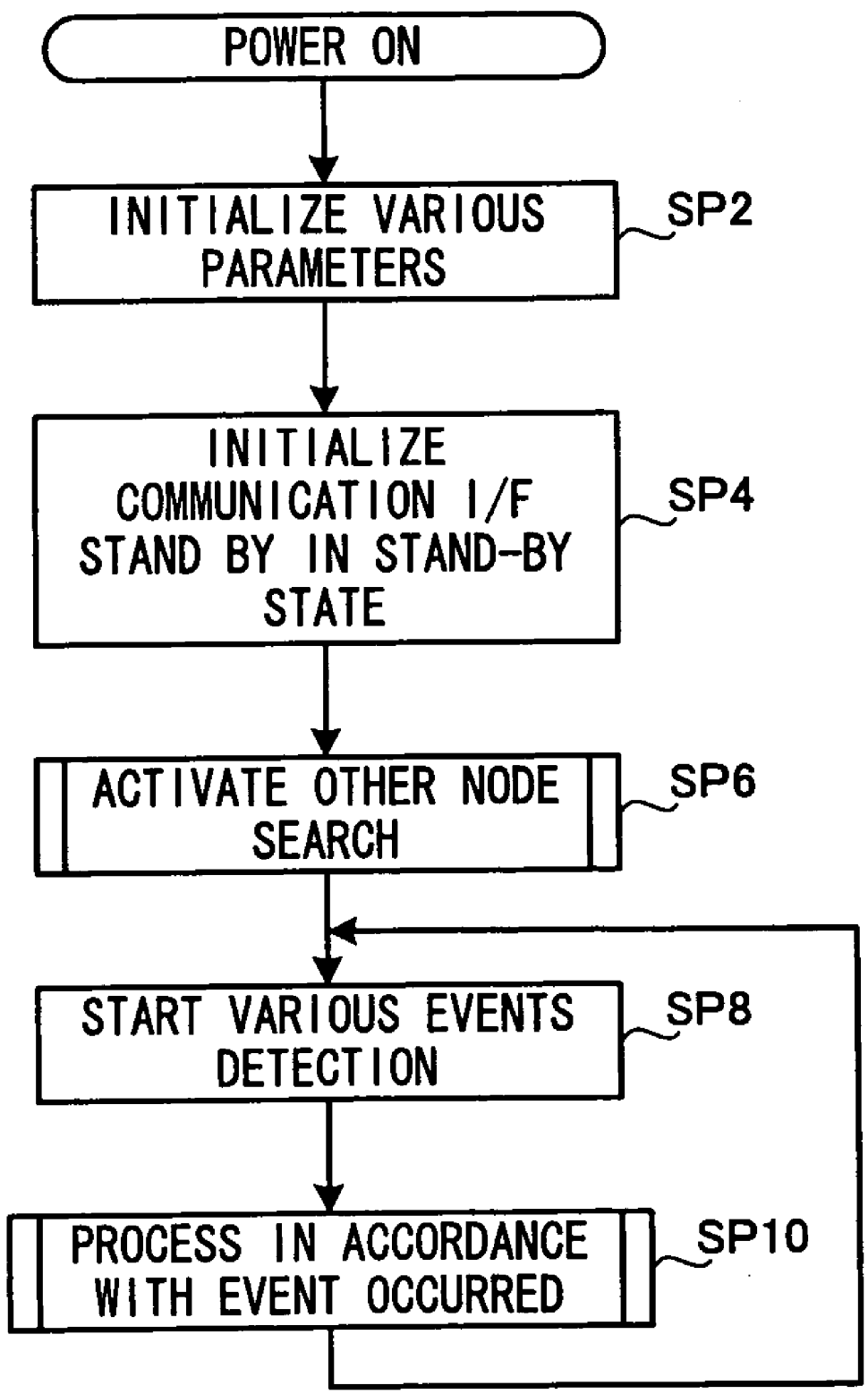
FIG. 5 is a flowchart showing a main routine of the first embodiment.

Subsequently, the operation of the present embodiment will be described. First, when the portable music player is powered on, main routine shown in FIG. 5 is activated. When the process goes to step SP2 in FIG. 5, various parameters are initialized. Here, out of the parameters to be initialized, major parameters will be described. The flags and the like supplied to the previously-described CODEC 8 are initialized to have the following values.

(1) Request flag REQ: "false"
(2) Volume coefficient AMP: "0.0"
(3) Send flag SEND: "false"

In addition, in the program according to the present embodiment, various flags to determine the operating states are used. Of these, descriptions and initialized states of major flags are as shown below.

(1) Search flag SEARCH: this flag indicates whether or not the player searches other nodes (other player or kiosk terminal) and is initialized to "false" (do not search).

(2) Playing flag PLAY: this flag indicates whether or not the player is during playback of the musical composition data, and is initialized to "false" (not during playback).

(3) Request allowance flag ALLOWREQ: this flag indicates whether or not the requests for the sample musical composition data from other nodes are allowed, and is initialized to "false".

Subsequently, when the process goes to step SP4, the wireless interface 14 is initialized. Subsequently, when the process goes to step SP6, the search flag SEARCH is set to "true" and the search for other nodes starts. Subsequently, when the process goes to step SP8, detection is performed to know whether or not any of various events are determined; and when any such event is detected, the process goes to step SP10 and various processes in accordance with the event are executed. After that, the processes from step SP8 to step SP10 are repeated. Note that the event to be detected in step SP8 is the operation performed in the operation unit 20, timer interruption, or the like. Hereinafter, the processes corresponding to the various events will be described in detail, individually.

2.4.2. Play/Stop Event Process (1) In the Case of Starting Playing Back the Musical Composition File.

Figure 6:
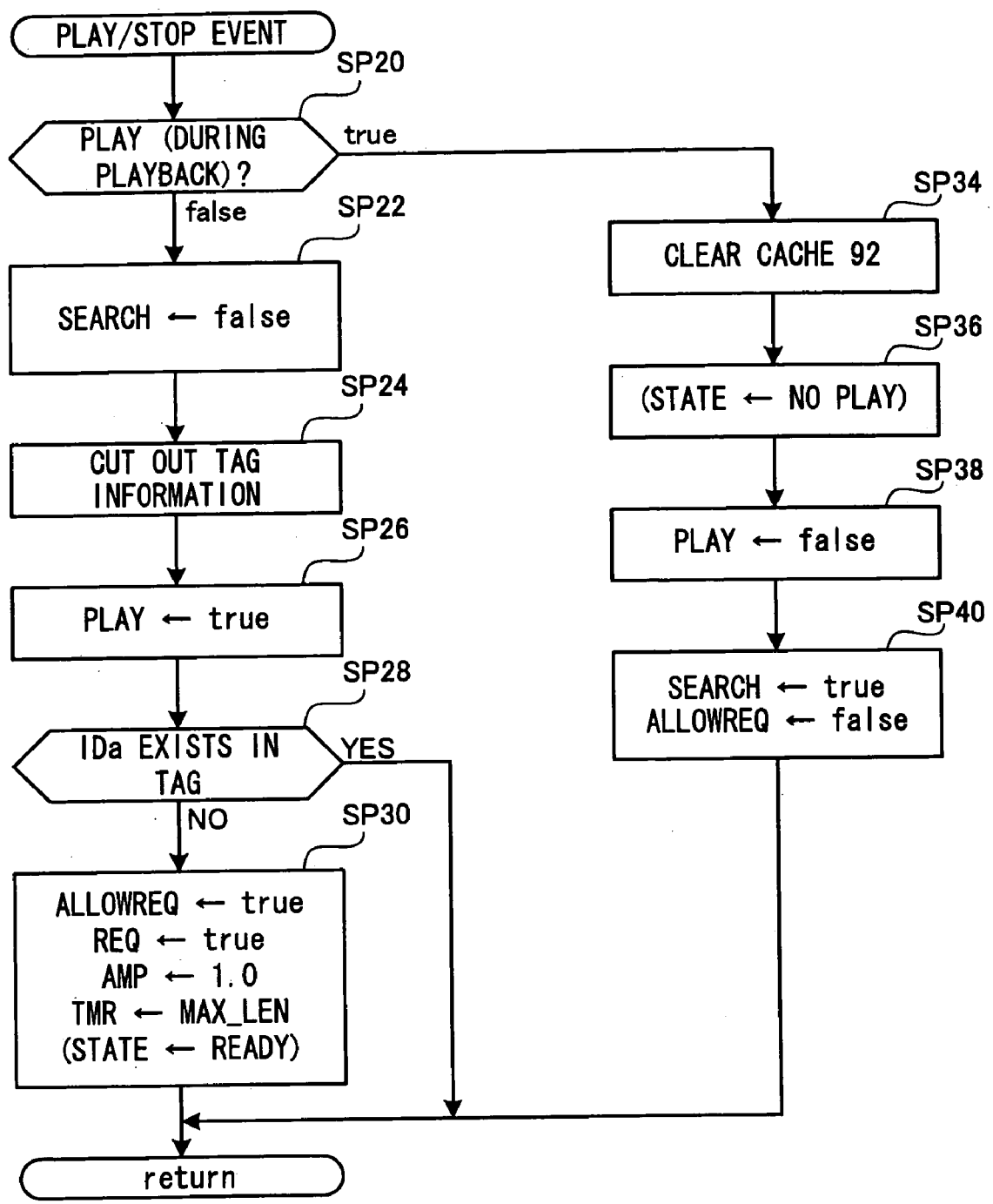
FIG. 6 is a flowchart showing play/stop event process routine of the first embodiment.

When a push event of the play/stop button 20a in the operation unit 20 is detected, the play/stop event process routine (FIG. 6) is activated. In FIG. 6, when the process goes to step SP20, whether or not the musical composition file is during playback at present is determined based on the playing flag PLAY. When it is not during playback, then the process goes to step SP22 and the search flag SEARCH is set to "false", meaning that the musical composition data originally stored in the player itself is going to be played back from this time and therefore no search is performed for the sample musical composition data supplied by the other node.

Subsequently, when the process goes to step SP24, then the tag information is separated from the musical composition data and is stored in the predetermined area in the RAM 6. Subsequently, when the process goes to step SP26, the playing flag PLAY is set to "true". Based on this, the musical composition file 54 is played back by later-described routine in FIG. 7A, and the tone emission is performed by the sound system 10 via the decoder 80 and the FIFO buffer 82. Subsequently, when the process goes to step SP28, whether or not the terminal identification number IDa exists in the tag information is determined. Note that the musical composition file having the terminal identification number IDa in its tag information is the sample musical composition file, and the musical composition file does not have it is the normal musical composition file.

When it is determined to be "NO" (normal musical composition file) in step SP28, the process goes to step SP30. Here, the request allowance flag ALLOWREQ is set to "true". This means that the player generates the sample musical composition data based on the musical composition file being currently played back by itself to respond to the request from other nodes. Further, the request flag REQ is set to "true", the volume coefficient AMP is set to "1.0", and a sample generation remaining time TMR is set to total sample generation time MAX_LEN (for example, 30 seconds). With these settings being performed, the cache status STATE in the READY state is returned from the CODEC 8, and after confirming this return, the present routine ends. Meanwhile, when it is determined to be "YES" (sample musical composition file) in step SP28, step SP30 is skipped. In other words, in the present embodiment, it is designed that the sample musical composition file is not transferred further to the other node when playing back the sample musical composition file.

(2) In a Case of Stopping the Playback of the Musical Composition File.

Meanwhile, when it is determined to be during playback (when the playing flag PLAY is "true") in step SP20, the process goes to step SP34. Here, the cache memory 92 is cleared. Since the cache status STATE in the NO PLAY state is returned to the CPU 2 from the CODEC 8 in response thereto, the process stands by until the return is made. Subsequently, when the process goes to step SP38, the playing flag PLAY is set to "false". Based on this, in later-described playback timer interruption routine (FIG. 7A), an actual playback process is not executed, so that the playback of the musical composition file is stopped.

Subsequently, when the process goes to step SP40, the search flag SEARCH is set to "true" and the search for other nodes starts again. Further, the request allowance flag ALLOWREQ is set to "false", whereby no response is made to the request from other nodes. In other words, the player becomes to be capable of receiving the sample musical composition data from other nodes since the player itself does not play back the musical composition file stored therein, where the player cannot supply any sample musical composition data to other nodes, hence allowing no request from other nodes.

2.4.3. Playback Timer Interruption Routine Process (FIG. 7A)

Figure 7A:
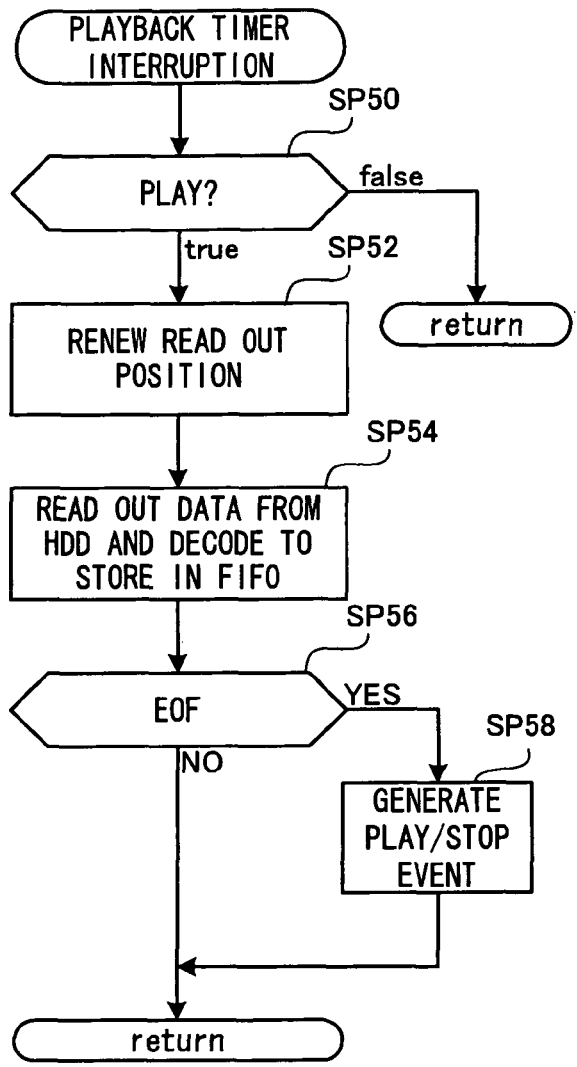
FIGS. 7A and 7B are flowcharts showing various interruption process routines of the first embodiment, respectively.

In the CPU 2, the playback timer interruption process routine shown in FIG. 7A is activated at every timer interruption interval dT of several msecs (milliseconds). In the drawing, when the process goes to step SP50, whether or not the musical composition file is during playback at present is determined based on the playing flag PLAY. Here, when the playing flag PLAY is determined to be "false", then the present routine ends immediately. Meanwhile, the playing flag PLAY is determined to be "true", the process goes to step SP52. Here, the address of readout position of the musical composition file in the hard disk 22 is updated to the extent of the predetermined step width.

Subsequently, when the process goes to step SP54, then the data corresponding to the above step width is read out from the address of the readout position and is supplied to the decoder 80 in the CODEC 8. Backed by this, in the CODEC 8, the supplied data is decoded to generate uncompressed PCM data to be accumulated in the FIFO buffer 82. Subsequently, when the process goes to step SP56, then whether or not the readout position after the update reaches to the end of file position EOF is determined. When it is determined "YES" here, the process goes to step SP58, and play/stop event process routine (FIG. 6) is compellingly called. Based on this, the processes of the above steps SP34 to SP40 are performed and the playing flag PLAY is set to "false". Meanwhile, when it is determined "NO" in step SP56, the step SP58 is skipped.

2.4.4. Sample Playback Timer Interruption Process (FIG. 7B)

Figure 7B:
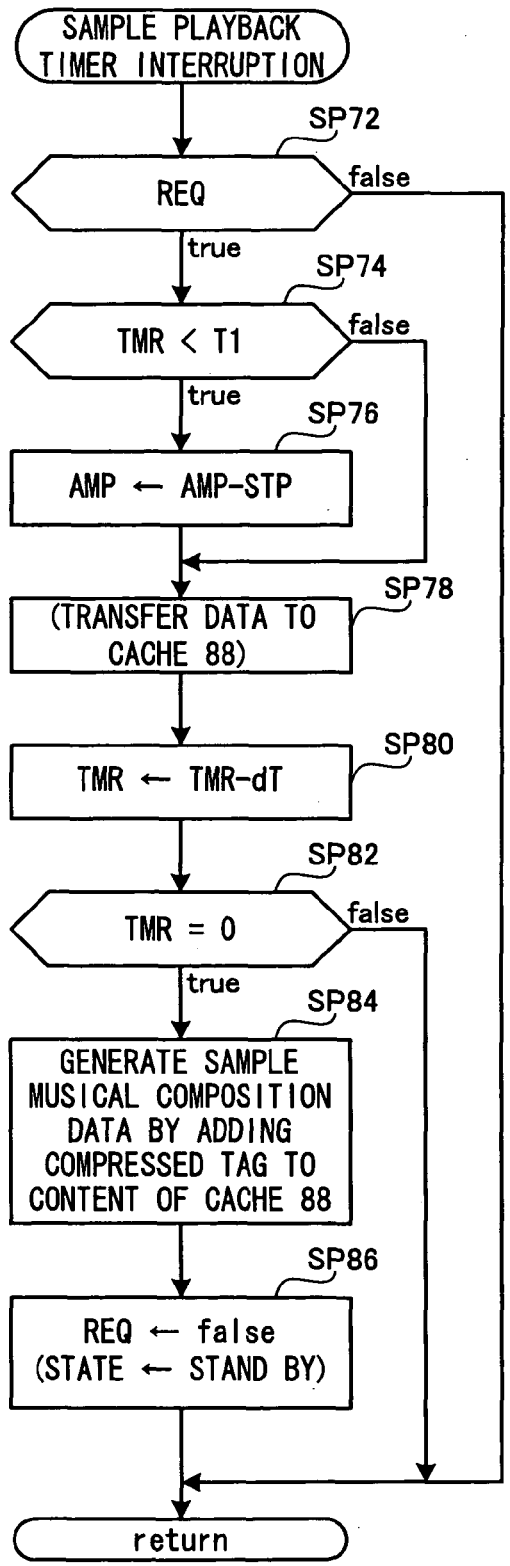

Further, at every timer interruption interval dT having the same cycle as of the playback timer interruption process routine (FIG. 7A) (note that the timings themselves are not necessarily the same), the sample playback timer interruption process routine shown in FIG. 7B is activated. When the process goes to Step SP72 in FIG. 7B, then whether or not the sample musical composition data is being generated is determined based on the request flag REQ. When the request flag REQ is "false", then the present routine ends immediately.

Meanwhile, when the request flag is "true", the process goes to step SP74, and whether or not the sample generation remaining time TMR becomes below the fade-out time T1 is determined. Note that the fade-out time T1 is a time of around "2" seconds. When it is determined to be "true" here, then the process goes to step SP76 and a predetermined step value STP is reduced from the volume coefficient AMP. Meanwhile, in the CODEC 8, the PCM data outputted from the FIFO buffer 82 is multiplied by the volume coefficient AMP in the amplifier 86 to be stored in the cache memory 88 thereafter. Accordingly, when the sample generation remaining time TMR is the fade-out time T1 or more, the step SP76 is skipped and the output sound signal of the FIFO buffer 82 is stored in the cache memory 88 without attenuation. Subsequently, when the process goes to step SP78, then the sound signal transfer to the cache memory 88 is confirmed.

Subsequently, when the process goes to step SP80, the timer interruption interval dT is reduced from the sample generation remaining time TMR. Subsequently, when the process goes to step SP82, then whether or not the sample generation remaining time TMR comes to "0 (zero)" is determined. When it is determined to be "false" here, the process of the present routine ends immediately. Meanwhile, when it is determined to be "true" in step SP82, then the process goes to step SP84, and a sample musical composition data generation command is supplied from the CPU 2 to the CODEC 8. In the CODEC 8, in response to the command, a tag information which is to be added to the sample musical composition data is generated based on the original tag information TAGs, the terminal identification number IDa of the portable music player, and the sample musical composition data generation time TIME.

Continuously thereafter, the PCM data stored in the cache memory 88 is supplied to the encoder 90 and the PCM data is compressed. The tag information is added to the compressed sound data obtained as the result thereof and they are stored in the cache memory 92. With this process, in the cache memory 92, the sample musical composition data that can be supplied to other portable music players is stored. With the above-described processes, the processes on the CPU 2 side to generate the sample musical composition data is completed, hence when the process goes to step SP86 thereafter, the request flag REQ is set to "false". When the generation of the sample musical composition data is completed in the CODEC 8 thereafter, the cache status STATE is set to STANDBY state, and the process of the present routine ends when confirmed the state.

2.4.5. Other Node Search Interruption Process (FIG. 8A)

Figure 8A:
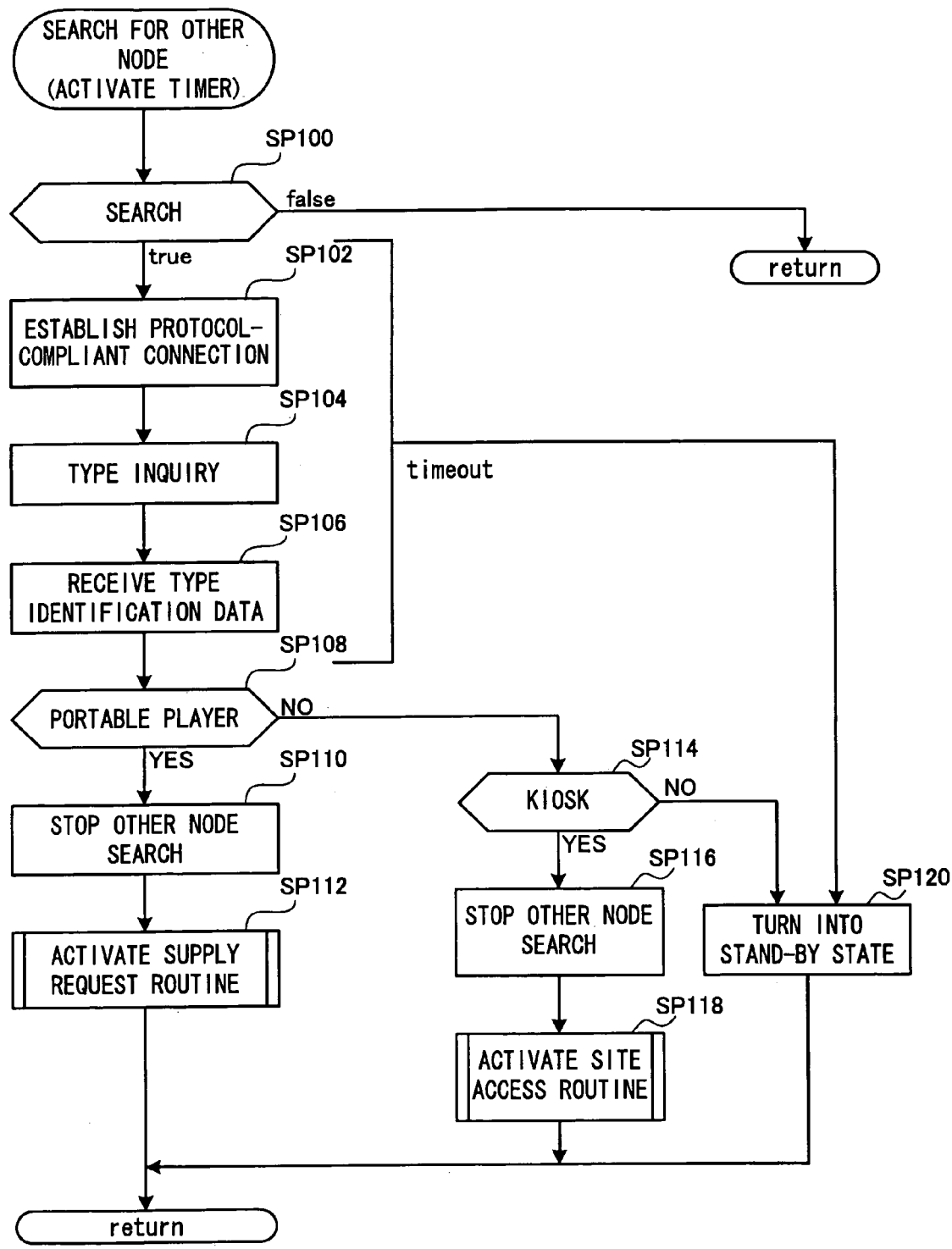
FIGS. 8A and 8B are other node search interruption process routine and request receiving process routine of the first embodiment, respectively.

In the CPU 2, other node search interruption process routine shown in FIG. 8A is activated at every intervals of several seconds being timer interruption intervals dTA. In the drawing, when the process goes to step SP100, whether or not to perform the other node search is determined based on the search flag SEARCH. Here, when the search flag SEARCH is "false", the present routine ends immediately. Meanwhile, when the search flag SEARCH is "true", the process goes to step SP102 in which connection establishment with other nodes is tried in compliance with communication protocol. In other words, the wireless interface 14 outputs a predetermined connection request, and when receiving a response thereto from other nodes, the fact is detected.

When the connection is established here, the process goes to step SP104 in which the type of the own device is indicated to be a "portable music player" and an inquiry signal inquiring about the type of the node of the other party is outputted. Subsequently, when the process goes to step SP106, type identification data indicating the type of the node of the other party is received. Note that when the process of the above-described steps SP102 to SP106 is not completed within a predetermined time, the process is determined to be time-out and goes to step SP120, in which the process of the present routine ends after the portable music player turns its state into the stand-by state.

Meanwhile, when the process of the above-described steps SP102 to SP106 is completed within the predetermined time, the process goes to step SP108 in which whether or not the received type identification data is the "portable music player" is confirmed. When it is determined to be "YES" here, the process goes to step SP110 in which the search flag SEARCH is set to "false" and the other node search is stopped. Subsequently, when the process goes to step SP112, supply request process routine (FIG. 9) for requesting the other party's node for the sample musical composition data is activated. The process will be described later.

Figure 10:
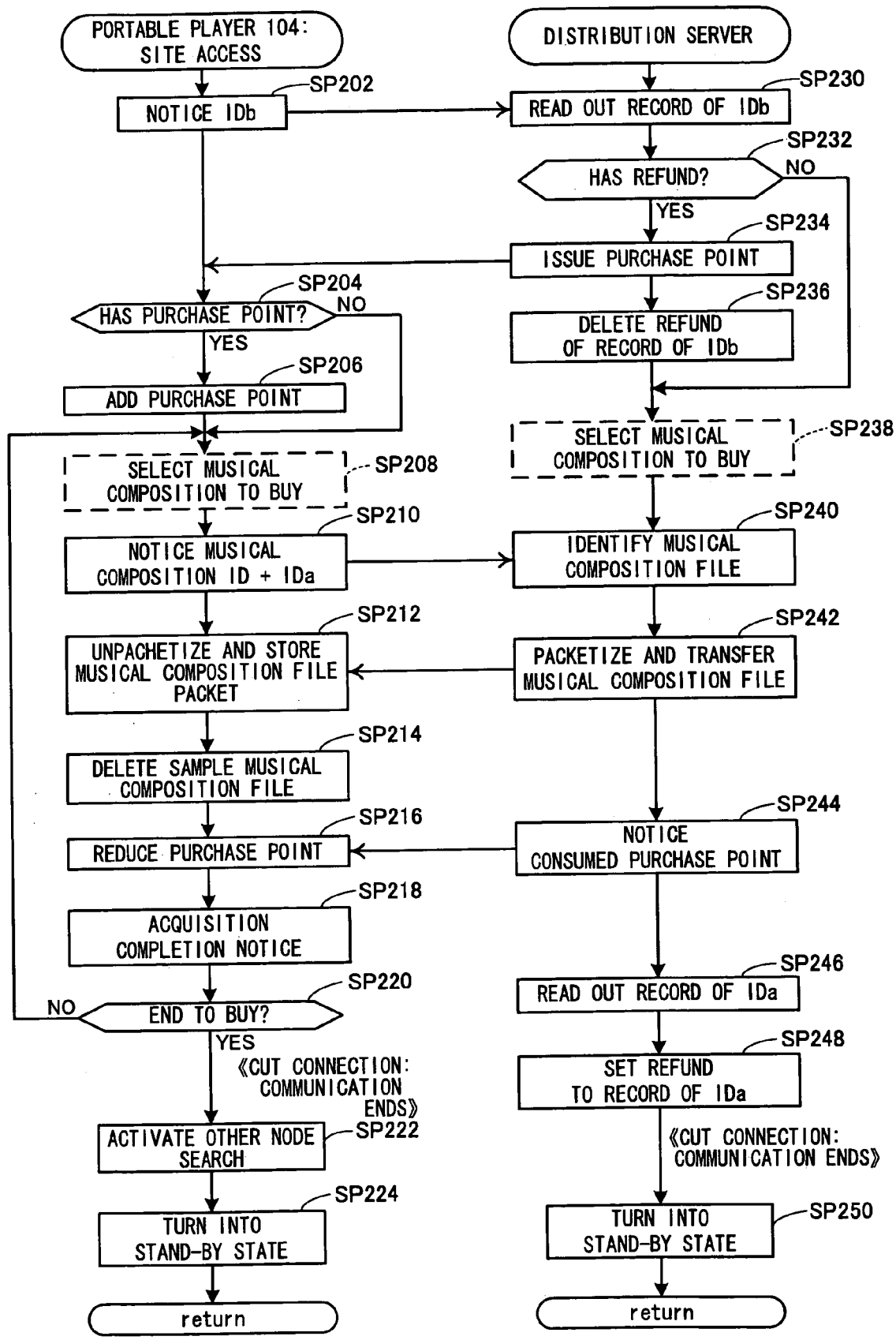
FIG. 10 is a flowchart showing a site access routine of the first embodiment.

Meanwhile, when the type identification data is not the "portable music player", the process goes to step SP114 in which whether or not the type identification data is the "kiosk terminal" is determined. When it is determined to be "NO" here, the process goes to step SP120, and the process of the present routine ends after the player turns into the stand-by state. When it is determined to be "YES" in step SP114, the process goes to step SP116 in which the search flag SEARCH is set to "false" and thereby the other node search is stopped. Subsequently, when the process goes to step SP118, site access routine (FIG. 10) for requesting the kiosk terminal for the musical composition data is activated. The process will be described later.

2.4.6. Request Receiving Process (FIG. 8B)

Figure 8B:
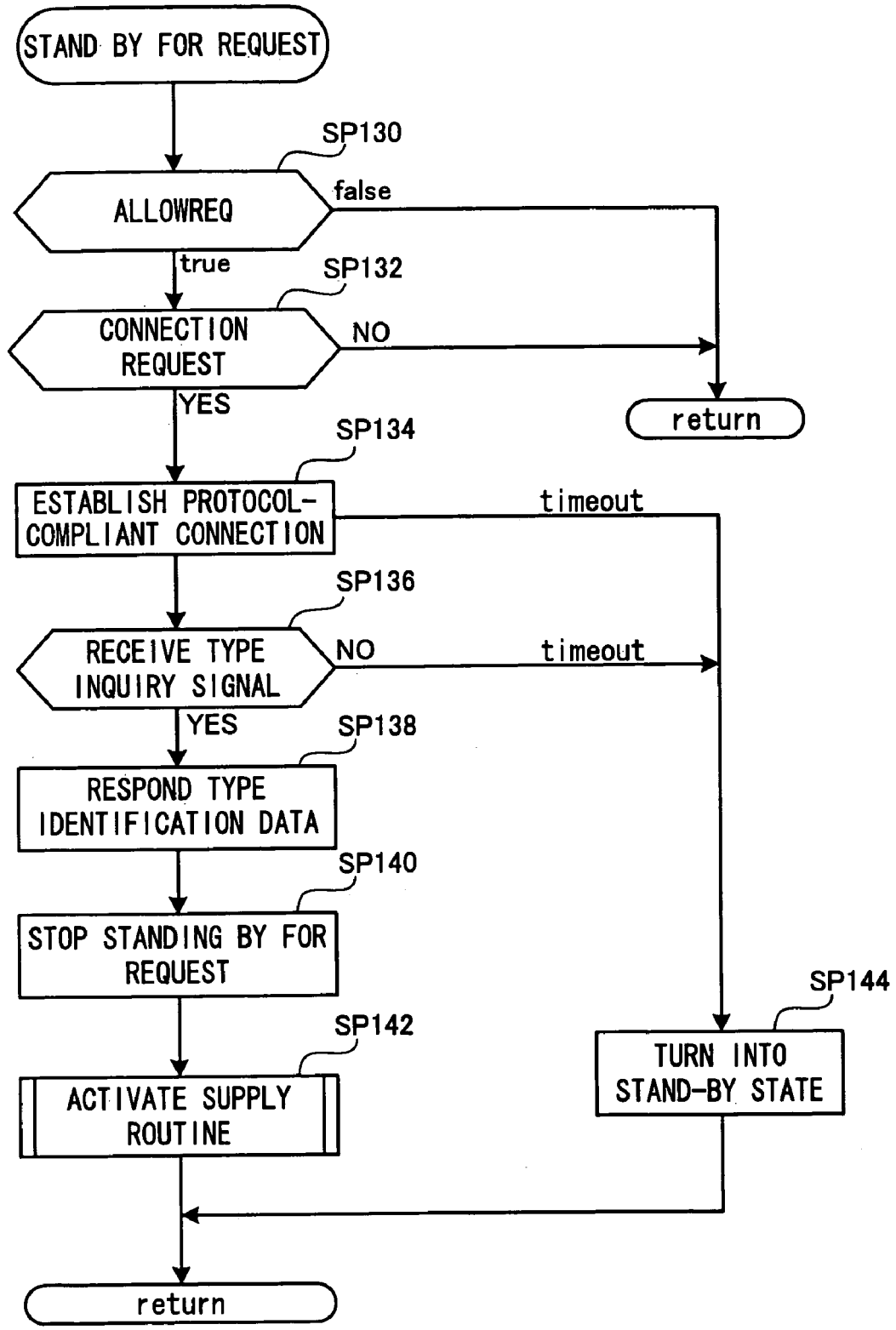

Further, in the CPU 2, request receiving process routine shown in FIG. 8B is activated at every timer interruption intervals dTB of several seconds. When the process goes to step SP130 in the drawing, whether or not the request allowance flag ALLOWREQ is "true" is determined. When the flag ALLOWREQ is "false", the process of the present routine ends immediately. Meanwhile, when the flag ALLOWREQ is "true", the process goes to step SP132 in which whether or not the wireless interface 14 has received the connection request from another node is determined. When no connection request has been received here, the process of the present routine ends immediately.

Meanwhile, when the connection request from another node is received, the process goes to step SP134 in which the connection establishment is tried in compliance with the communication protocol. When the connection is established here, the process goes to step SP136 in which the process stands by until the type inquiry signal is received from the other party's node within the time limit of a predetermined time. Here, when the process of the above-described steps SP134 and SP136 is not completed within the predetermined time, the process goes to step SP144 in which the present routine ends after the portable music player turns into the stand-by state. This is because the fact that the portable music player does not receive the type inquiry can be considered that the other party's device is of the type different from the own device.

Figure 9:
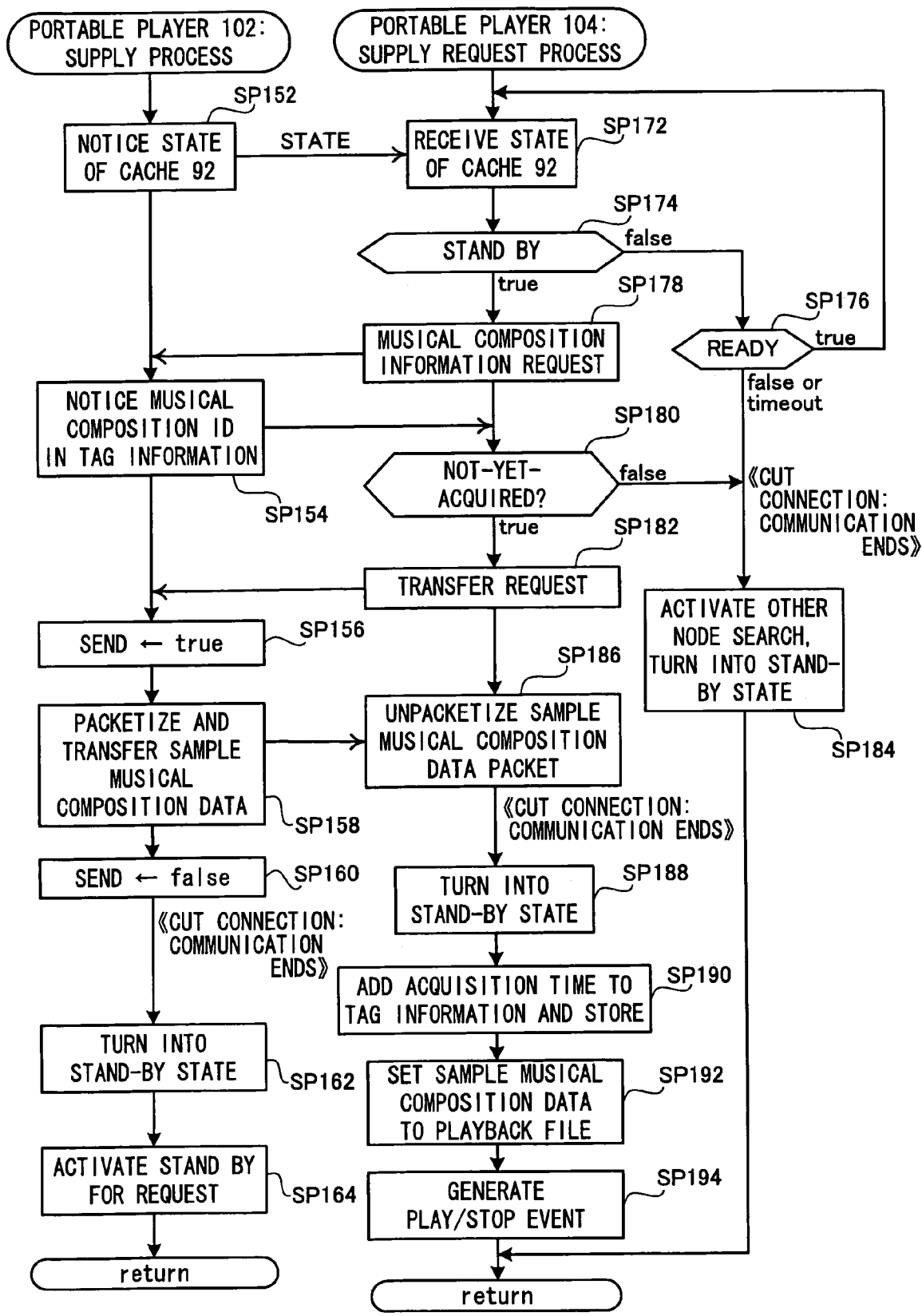
FIG. 9 is a flowchart showing a supply process and a supply request process routine of the first embodiment.

Meanwhile, when the process of the steps SP134 and SP136 is completed within the predetermined time, the step goes to step SP138. Here, the type identification data of the own device is returned to the other party's node (being the portable music player of the same type as of the own device). Subsequently, when the process goes to step SP140, the request allowance flag ALLOWREQ is set to "false", and no response is made thereafter even when a connection request from nodes other than the other party's node is received. Subsequently, when the process goes to step SP142, supply process routine shown in FIG. 9 is activated.

2.4.7. Supply Process and Supply Request Process

In FIG. 1B, it is described about the supply of the sample musical composition data from the portable music player 102 to the portable music player 104, however, in more detail, the supply is such that the supply request process routine is executed in the portable music player 104 through step SP112 of the above-described other node search interruption process routine (FIG. 8A), and the supply routine is activated in the player 102 through step SP142 of the above-described request receiving process routine (FIG. 8B). Therefore, the process details of the players 102, 104 in such a case will be described with reference to FIG. 9.

First, when the process goes to step SP172 in the player 104, an inquiry requesting to send the cache status STATE being the state of the cache memory 92 of the portable music player 102 is outputted from the player 104 to the player 102. When the player 102 receives the inquiry, the process goes to step SP152, and the player 102 sends the cache status STATE to the player 104. When the player 104 receives the cache status STATE, the process goes to step SP174 in which whether or not the cache status STATE is "STAND BY" is determined. When it is determined to be "NO" here, the process goes to step SP176 in which whether or not the cache status STATE is "READY" is determined. When it is determined to be "YES" here, the process goes back to step SP172 in which the inquiry about the value of the cache status STATE is made again.

In this manner, when the cache status STATE returned from the portable music player 102 is continuously "READY", a loop of steps SP172, SP174, and SP176 is repeated in the player 104. However, when the repeated time of the loop of the steps exceeds a predetermined time, it is determined in step SP176 to be the time-out occurrence, and the process goes to step SP184. Here, after the connection is cut, the search flag SEARCH is set to "true" again, and the other node search starts. Then, the present routine ends after the player 104 turns into the stand by state. Further, when "NO PLAY" is noticed as a cache status STATE from the player 102, the process of step SP184 is executed immediately through steps SP174 and SP176.

Meanwhile, when the player 104 receives the cache status STATE of "STAND BY" from the portable music player 102, the process goes to step SP178 in the player 104 in which a musical composition data request signal requesting a musical composition ID for identifying the sample musical composition data is sent to the player 102. In the player 102, when the musical composition data request signal is received, the process goes to step SP154 in which a musical composition ID related to the sample musical composition data is returned to the player 104. Note that the musical composition ID is an identification number uniquely identifying the musical composition. Generally, when converting the musical composition recorded in a CD or the like into the musical composition data in the MP3 format, the identification number of the CD is recorded in the tag information. Therefore, the combination of the identification number of the CD and a track number of the CD is preferably used as the musical composition ID.

Subsequently, when the player 104 receives the musical composition ID, the process goes to step SP180 in which whether or not the musical composition data (normal musical composition data) related to the musical composition ID is not-yet-acquired is determined. When the musical composition data related to the musical composition ID is already recorded in the musical composition file area 52 here, it is determined to be "false" and the process goes to step SP184. Specifically, in that case, since there is no merit to download the sample musical composition data, the search flag SEARCH is set to "true" again after the connection is cut, and the other node search starts. In this case, in stead of starting the other node search, it is possible to set the sample musical composition data that is already acquired as the play-back file and execute a process of generating a play/stop event (later-described steps SP192 and SP194) in order to play back the sample musical composition data.

Meanwhile, when it is determined to be "true" in step SP180, the process goes to step SP182 in which a transfer request for the sample musical composition data is sent to the player 102. When the player 102 receives the transfer request, the send flag SEND is set to "true". When the process goes to step SP158 in the player 102, the sample musical composition data is packetized and outputted via the wireless interface 14.

When the portable music player 104 receives the sample musical composition data, the process goes to step SP186 in which the sample musical composition file 62 is generated in the hard disk 22 based on the sample musical composition data. Note that when referring to FIG. 3 again, out of the tag information 64 of the sample musical composition file 62, the original tag information 68, the generation time 70 and the supplier information 74 are the original tag information TAGs, the sample musical composition data generation time TIME and the terminal identification number IDa, respectively. Further, the time that the player 104 acquired the sample musical composition data is added as the acquisition time 72 to the sample musical composition file.

Here, when the player 102 completes to send the sample musical composition data, the process goes to step SP160 in which the send flag SEND is set to "false". Then, the connection with the player 104 is cut. Subsequently, when the process goes to step SP162 in the player 102, the state of the player 102 turns into the stand-by state and the process goes to step 164 in which the request allowance flag ALLOWREQ is set to "true" to respond to the request from other portable music players and the process of the supply process routine of the player 102 ends.

Meanwhile, in the portable music player 104, when the sample musical composition file 62 is generated in the above-described step SP186, the connection with the player 102 is cut. Subsequently, when the process goes to step SP188, the state of the player 104 turns into the stand-by state. When the process goes to step SP190 next, the previously received sample musical composition file 62 is designated as a file to be played back (playback file). When the process goes to step SP194 next, the play/stop event with respect to the current playback file is compellingly generated. Based on this, the above-described play/stop event process routine (FIG. 6) is activated, so that the sample musical composition data is played back automatically.

2.4.8. Site Access Process and Musical Composition Data Distribution Process In FIG. 1C, it is described that the portable music player 104 can download the non-free musical composition data via the kiosk terminal of the distribution server 100, however, in more detail, the download is such that site accessing routine is executed in the player 104 through step SP118 of the previously-described other node search interruption process routine (FIG. 8A) so that distribution process for distributing the musical composition data is activated in the distribution server 100. Therefore, the process in the player 104 and the distribution server 100 in such a case will be described with reference to FIG. 10.

When the process goes to step SP202 in the player 104, the terminal identification number of the player 104 is notified to the distribution server 100. When the distribution server 100 receives the notice of the terminal identification number IDb, the process goes to step SP230 in which the record of the terminal identification number IDb is read out from the user database and the contents of refund data in the record is confirmed. Note that the refund data is to be a basis when the purchase point is issued to the portable music player, and process details to add refund data will be described later. Subsequently, when the process goes to step SP232 in the distribution server 100, whether or not any refund data with respect to the player 104 is recorded is determined.

When it is determined to be "YES" in step SP232, the process goes to step SP234 in which the purchase point corresponding to the refund data is issued to the player 104. Subsequently, when the process goes to SP236, the refund data with respect to the terminal identification number IDb is deleted. Meanwhile, in the player 104, whether or not the purchase point is issued is determined in step SP204, and when the purchase point is issued, the process goes to step SP206 in which the purchase point is added. Specifically, an encrypted purchase point is recorded in a predetermined area in the flash memory 4.

Subsequently, when the process goes to step SP208 in the portable music player 104, a list of the sample musical composition files or the like is displayed in the display 18. Accordingly, the user of the player 104 can select the musical composition file to buy from the list. In addition, there may be a case where the user buys a musical composition file without regard to the sample musical composition files. In such a case, the musical composition file is to be selected via the display, keyboard, or the like provided in the kiosk terminal (step SP238).

Here, when the user performs any operation in the portable music player 104 to buy the musical composition file corresponding to any of the sample musical composition files, the process goes to step SP210 in the player 104, in which the musical composition ID of the musical composition file together with the terminal identification number IDa of the player 102 having generated the sample musical composition file are noticed to the distribution server 100. In the distribution server 100, regardless of the user operation, the process goes to step SP240, in which the musical composition file to sell is identified. Subsequently, when the process goes to step SP242, the musical composition file is packetized and sent to the player 104. In response thereto, in the player 104, the process goes to step SP212 in which the musical composition file packet is extracted.

Subsequently, when the process goes to step SP214, the sample musical composition file corresponding to the extracted musical composition file is deleted. Note that when the musical composition file is that bought regardless of the sample musical composition files, no sample file corresponding to the musical composition file exists from the beginning, so that there is no file to be deleted. Subsequently, when the process goes to step SP244 in the distribution server 100, the consumed value of the purchase point is noticed to the player 104. In response thereto, in the player 104, the process goes to step SP216 in which the purchase point corresponding to the noticed consumed amount is reduced. Note that when the purchase point charged in the player 104 is insufficient for the amount of the musical composition file to buy, the fact is noticed and a message prompting to add the purchase point (to credit money) to the player 104 is displayed in the display 18.

Subsequently, when the process goes to step SP218 in the player 104, a message saying that the musical composition data acquisition is completed together with an inquiry message inquiring about whether or not to end the musical composition data buying are displayed in the display 18. Subsequently, when the process goes to step SP220, the process stands by until the instruction to end or not to end the musical composition data buying is inputted. When the instruction "not to end" is inputted by the user here, the process goes back to step SP208 and the same process as of the above-described steps SP208 to SP218 is executed for the next musical composition file to be bought.

When the instruction "to end" is inputted in step SP220, the connection between the portable music player 104 and the kiosk terminal is cut. Subsequently, when the process goes to step SP222, the search flag SEARCH is set to "true" and the search for the other node starts. Subsequently, when process goes to step SP224, the state of the player 104 turns into the stand-by state and the process of the present routine ends.

Meanwhile, when the process goes to step SP246 in the distribution server 100, the record of the terminal identification number IDa noticed in the above-described steps SP210 and SP240 is read out. Subsequently, when the process goes to step SP248, the refund data is added to the user of the terminal identification number IDa. Based on this, when the user of the portable music player 102 of the terminal identification number IDa tries to buy a musical composition data next time, as described in the above-steps SP204 and SP206, the purchase point is added to the portable music player 102. Note that when the musical composition data is bought through the above-described step SP240, the terminal identification number IDa is not noticed to the distribution server 100, so that the process of the steps SP246 and SP248 are skipped. When the process goes to step SP250, the connection is cut also on the distribution server 100 side; and the kiosk terminal terns into the stand-by state.

3. Second Embodiment

3.1. Hardware Configuration

Subsequently, a second embodiment according to the invention will be described. In the above-described first embodiment, as a sample musical composition data, a musical composition data compressed into the MP3 format is used, however, the sample musical composition data is a musical composition data of a short length, so that the capacity of the hard disk 22 is not affected so much even if uncompressed data in the PCM format is used. Further, in the first embodiment, the portable music player needs a function to encode the musical composition data in the MP3 format, however, the cost of the device can be reduced if the function can be omitted. From such a viewpoint, the second embodiment aims to generate the sample musical composition data as the uncompressed PCM data. Specifically, in the player supplying the sample musical composition data, the uncompressed sound data is sent repeatedly; and the receiving player is to receive the uncompressed sound data repeatedly. For the communication between the both, for example, SCO link in Bluetooth is used.

Figure 11:
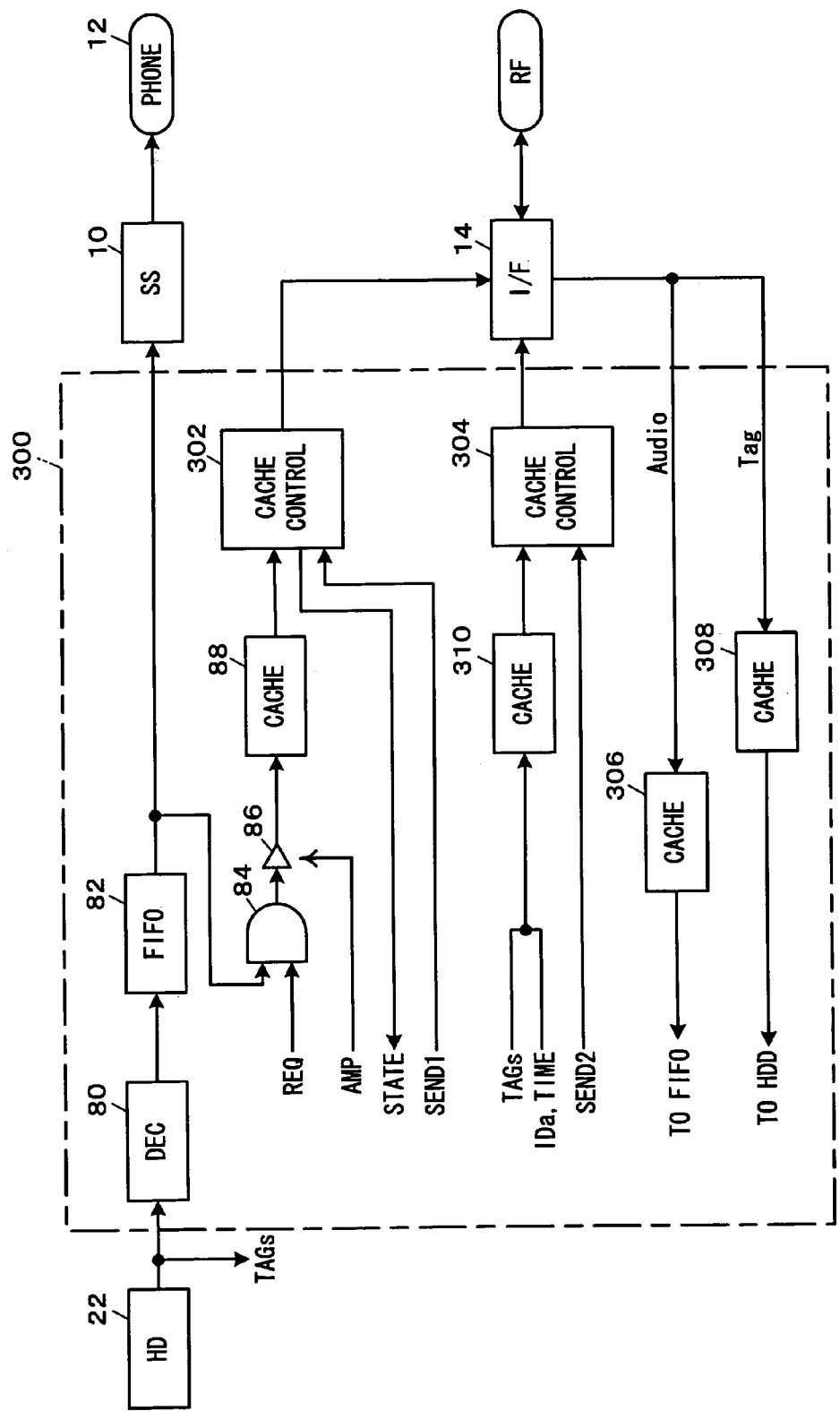
FIG. 11 is a block diagram showing functions of a CODEC 300 of a second embodiment.

Hardware configurations of the distribution server 100 and portable music players 102, 104 in the second embodiment are almost the same as of the first embodiment, while a CODEC 300 shown in FIG. 11 is used instead of the CODEC 8 of the first embodiment. In FIG. 11, "302" denotes a cache control circuit to control the cache memory 88, which supplies the content of the cache memory 88 to the wireless interface 14 when a send flag SEND1 from the CPU 2 becomes "true". Also, the cache control circuit 302 returns one of the following cache status STATE to the CPU 2 as a state of the cache memory 88.

(1) NO PLAY: a state where the cache memory 88 does not have data stored.

(2) READY: a state where the sample musical composition data is being generated.

(3) STAND BY: a state where the sample musical composition data is completed and can be sent.

Further, "304" denotes a cache control circuit to control a cache memory 310, which supplies the content of the cache memory 3 10, namely the original tag information TAGs, the terminal identification number IDa and the sample musical composition data generation time TIME, to the wireless interface 14 when a send flag SEND 2 from the CPU 2 becomes "true". "306" and "308" denote cache memories that store the content of musical composition data when the wireless interface 14 receives the musical composition data from another node. In other words, the cache memory 306 stores compressed or uncompressed sound data, and the cache memory 308 stores the tag information.

Further, as compared to the memory map (FIG. 3) of the hard disk 22 in the first embodiment, the sample musical composition file 62 has a different configuration. Specifically, in the present embodiment, the sample musical composition file 62 is composed only of the tag information 64, and the sample musical composition file 62 does not contain the compressed sound data 66. Note that the content of the tag information 64 itself is the same as of the first embodiment.

3.2. Operation of Second Embodiment 3.2.1. Play/Stop Event Process (FIG. 12)

Subsequently, the operation of the present embodiment will be described. Respective routines in the present embodiment are the same as of the first embodiment unless otherwise specifically described herein. Accordingly, the description will be given about differences between both the embodiments.

First, a play/stop event process routine according to the present embodiment will be described with reference to FIG. 12. In the present routine, steps SP302 and SP304 are executed, respectively, instead of executing steps SP30 and SP34 of the corresponding routine (FIG. 6) in the first embodiment. First, step SP302 is the same as of step SP30 in the first embodiment except that the process stands by until the cache status STATE turns into "STAND BY".

In the present embodiment, uncompressed sound data is sent to another portable music player as it is without generating compressed sound data, in which sampling frequencies of the respective players are the same, so that the sample musical composition data can be sent immediately when a slight amount of the sample is stored in the cache memory 88. Specifically, in the cache memory 88, new samples are added in sequence at the same speed as of the readout speed to send, so that it is possible to start sending even if the uncompressed sound data stored in the cache memory 88 is halfway. Accordingly, after the play/stop event occurs, the cache status STATE turns into "STAND BY" within an extremely short time, so that the process is designed to stand by until the cache status STATE turns into "STAND BY" state. Further, when sending the sample musical composition data, both the cash memories 88, 310 are used, so that both the cache memories 88, 310 are cleared in step SP304.

Figure 13:
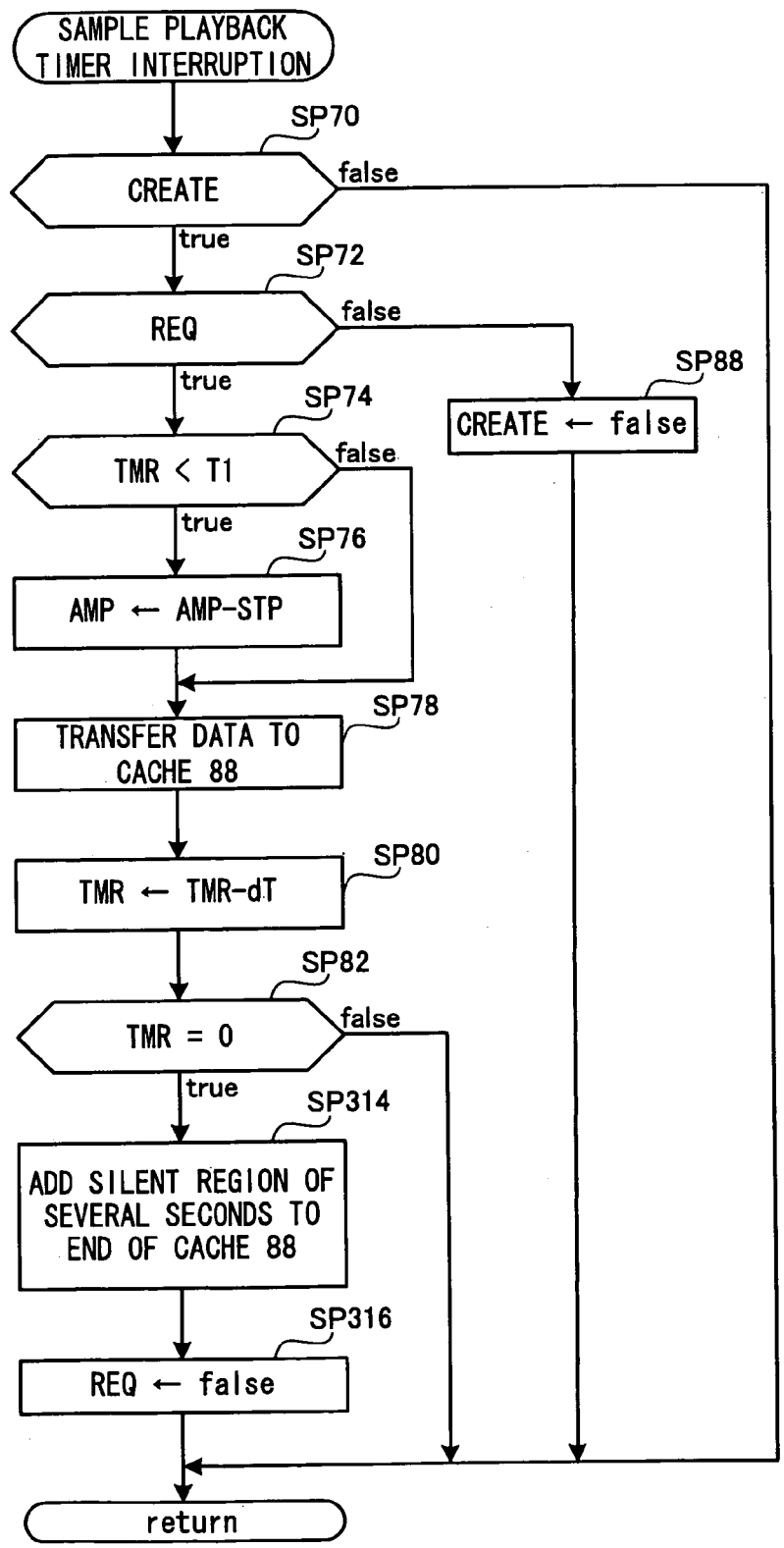
FIG. 13 is a flowchart showing a sample playback timer interruption process routine of the second embodiment.

3.2.2. Sample Playback Timer Interruption Process (FIG. 13)

Subsequently, a sample play timer interruption process routine according to the present embodiment will be described with reference to FIG. 13. In the present routine, steps SP314 and SP316 are executed, respectively, instead of steps SP84 and SP86 of the corresponding routine (FIG. 7B) in the first embodiment. First, in step SP314, several seconds of silent region is added at the end of the cache memory 88. In the present embodiment, the same uncompressed sound data is sent from the player 102 to the player 104 repeatedly, therefore this is to make the border between the each repeat definite. Further, in step SP316, the request flag REQ is set to "false". Since the fact that the cache status STATE turns into "STAND BY" is already confirmed in the above-described step SP302, the confirmation of the cache status STATE is not performed in this step SP316.

Figure 14:
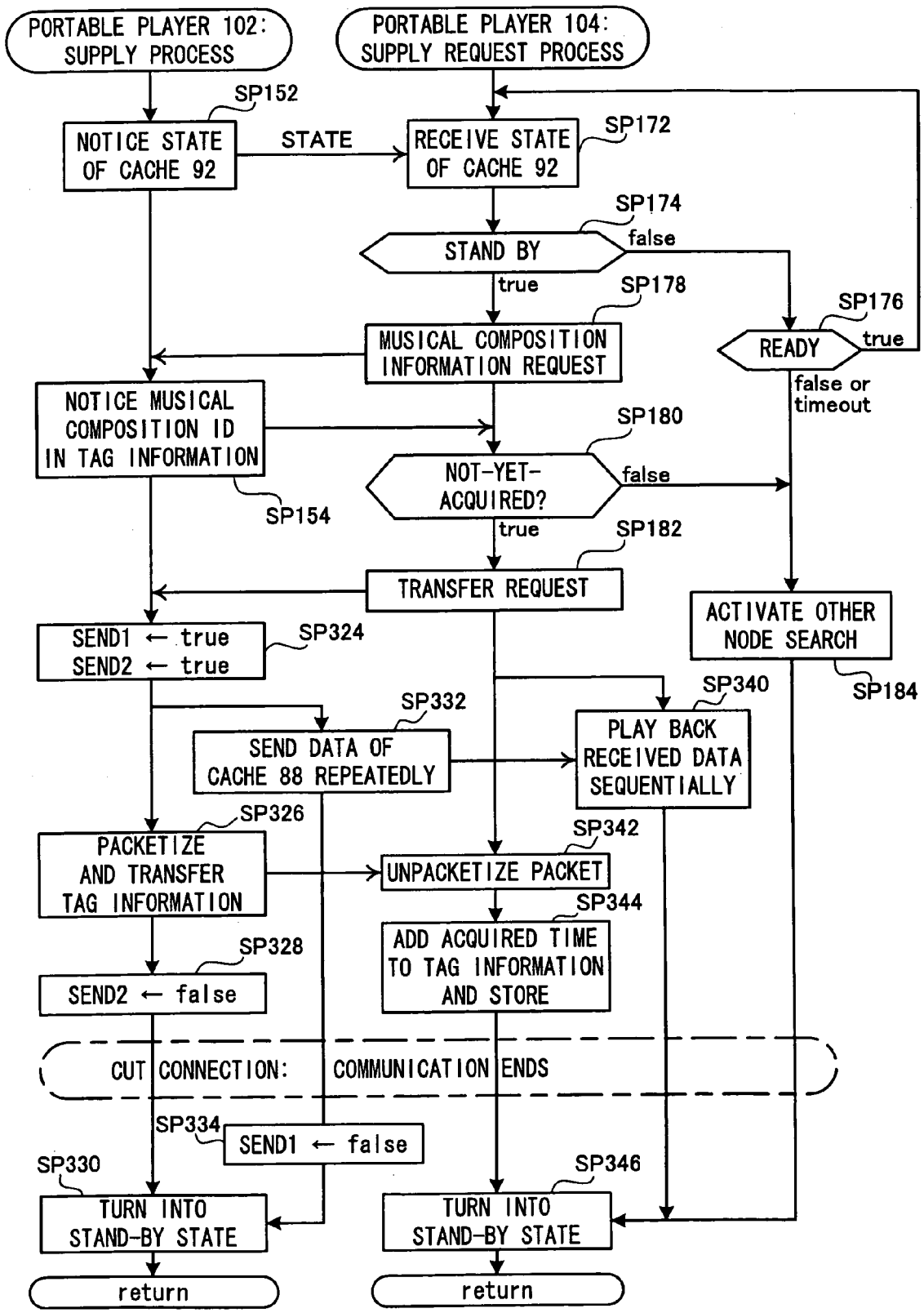
FIG. 14 is a flowchart showing a supply process and a supply request process routine of the second embodiment.

3.2.3. Supply Process and Supply Request Process (FIG. 14)

Subsequently, a supply process and supply request process routine according to the present embodiment will be described with reference to FIG. 14. When comparing the present routine and the corresponding routine (FIG. 9) of the first embodiment, the process of step SP154 and thereafter of the player 102 and the process of step SP182 and thereafter of the player 104 are different. First, in the player 102 supplying the sample musical composition data, when it receives the transfer request from the player 104 after finishing the process of step SP154, the process goes to step SP324 in which the send flags SEND1, SEND2 are set to "true". Subsequently, in the player 102, the processes of steps SP332 and thereafter and the processes of steps SP326 and thereafter are executed in parallel.

First, in step SP332, the uncompressed sound data stored in the cache memory 88 is sent to the player 104 repeatedly. Further, in step SP326, the tag information in the cache memory 310 is packetized in the cache control circuit 304 and sent to the player 104 via the wireless interface 14. Since the tag information needs to be sent "once", after completing to send the tag information, the process goes to step SP328, and the send flag SEND2 is set to "false".

Meanwhile, in the player 104 receiving the sample musical composition data, when the transfer request process in step SP182 is completed, the process stands by until the tag information or the uncompressed musical composition data is supplied from the player 102. When the tag information is received from the player 102, the process goes to step SP342 and the packet related to the tag information is unpacketized. Subsequently, when the process goes to step SP344, the tag information 64 is generated based on the unpacketized content (namely, the original tag information TAGs, terminal identification number IDa and sample musical composition data generation time TIME) and current time (acquisition time 72) of the clock in the player 104 are stored in the hard disk 22.

Further, when the player 104 receives the uncompressed sound data, the process goes to step SP340 in which the received uncompressed sound data is played back. As described above, the uncompressed sound data is sent by the player 102 repeatedly, so that the uncompressed sound data is played back repeatedly in the player 104 as long as the connection between the players 102, 104 is established.

Here, when the connection between the players 102, 104 is cut; the processes of steps SP334 and SP330 are executed in the player 102, the send flag SEND1 is set to "false", the state of the player 102 turns into the stand by state, and the supply process ends. Meanwhile, in the player 104, after the connection is cut, the process goes to step SP346 in which the state of the player 104 turns into the stand-by state to end the supply request process.

4. Modifications

The present invention is not limited to the above-described embodiments, and various modifications, for example, as will be described below are possible.

(1) In the above respective embodiments, the MP3 format is adopted as a musical composition file format, however, the file format may be the compressed sound data format other than the MP3. Further, the media storing the musical composition data is not limited to the hard disk, and a semiconductor memory device such as a flash memory, a magneto-optical recording media such as an MO or MD, and an optical recording media of a phase-transition type such as a CD or DVD are also acceptable. Furthermore, the transmission method between the respective nodes is not limited to the Bluetooth, and the other wireless transmission method allowing two-way transmission of digital data exchange is also acceptable.

(2) In the above respective embodiments, the processes of steps SP230 to SP250 (FIG. 10) are executed in the distribution server 100, however, a part of these processes may be assigned to and performed by the kiosk terminal.

(3) In the above respective embodiments, the sample musical composition data is generated based on the total sample generation time MAX_LEN just after the device starts playing back the musical composition data, however, the sample musical composition data may be generated from any other portion of the original musical composition data. For instance, the sample musical composition data may be generated from a "main part" of the musical composition data. In that case, the start time and the end time of the main part of the musical composition data are included in the tag information 56 of the musical composition file 54, and preferably the value of the request flag REQ is set in accordance therewith. Further, it is also preferable to make the sampling frequency of the sample musical composition data be lower than the sampling frequency of the original musical composition data. For instance, when the sampling frequency of the original musical composition data is "44 kHz", it is also preferable to set the sampling frequency of the sample musical composition data to "22 kHz".

(4) In the above-described first embodiment, the compressed sound data for the sample musical composition data is generated by decoding the compressed sound data 58, 66 in the musical composition file by the decoder 80 in the CODEC 8, and further encoding the results by the encoder 90. However, the compressed sound data for the sample musical composition data may be generated by directly cutting out a part of the compressed sound data contained in the musical composition file being a play-back target.

(5) Further, in the above respective embodiments, it is possible to design the device such that the portable music player having acquired the sample musical composition data does not perform the acquisition of the other sample musical composition data for a predetermined time (around several minutes). This is to prevent the access to the same portable music player again and again. Also, it is possible to design the device such that the device concurrently establishes connections with the multiple portable music players, and the node of the other party from which the sample musical composition data is to be acquired is switched in accordance with the user instruction. Note that, when employing the Bluetooth as a communication protocol, the connection can be established with "seven" other nodes at maximum.

(6) Further, in the above respective embodiments, when the musical composition data is not played back, the respective players automatically search for other nodes. However, it is possible to design the player such that the search for other nodes is performed only when the player receives the instruction explicitly from the user. Further, the generation time 70 and the acquisition time 72 are recorded in the sample musical composition data, hence, the sample musical composition data may be deleted automatically when a predetermined time (for example, a week) has passed after either the generation time 70 or the acquisition time 72.

(7) Further, in the respective above embodiments, the musical composition file is bought based on the purchase point of prepaid principle; however, it is also possible to be based on cash payment directly to the kiosk terminal or credit-card settlement by previously registering credit information. In that case, based on the refund settings, the discount may be performed with respect to the purchase price of the musical composition data that is newly bought.

(8) Further, in the above respective embodiments, a part of the original musical composition is supplied as a sample musical composition data, however, the non-free musical composition data may be supplied as it is as a sample musical composition data by making the non-free musical composition data a playback-restricted content (in terms of, for example, play-back time or play-back portion) with the help of DRM (Digital Rights Management) technology. In that case, what is needed to do for the party being supplied with the musical composition data is to buy or download a key data for releasing the playback restriction by the DRM technology via the kiosk terminal.

(9) Further, in the above-described embodiments, the billing process is performed via the kiosk terminal. However, the billing process is not limited thereto. For instance, as in a billing process for a pay service in a cellular phone, it is possible that the portable music player directly communicates with the system server for the settlement. In that case, it is also possible to download the original musical composition data or the key data together by communicating with the billing system server (or the other server).

(10) In the above respective embodiments, the various processes are executed by the programs that operate on the distribution server 100 or the portable music players. However, it is also possible to distribute these programs only by storing them in the record media such as the CD and a flexible disk or via a transmission channel.

As has been described, according to the invention, it is possible to acquire the sound data that is supplied by another music player in response to the musical composition supply request, so that the sound data having sound quality being worthy of listening can be distributed to the users other than the user of the music player playing back the musical composition data. Further, the sound data is the musical composition data during playback but having usage restrictions, so that the copyrights of the musical composition data and the like can be protected. Further, for those users other than the user being playing back the musical composition data, the content of the sound data is unknown one, therefore it is possible to offer an off-center usage method of the music player.

What is claimed is:

1. A music player, comprising:
an identification number memory storing a unique identification number of musical composition data;
a musical composition data memory storing said musical composition data;
a player reading out and playing back the musical composition data;
a preview generator for generating a sound data preview during playback of the musical composition data, said sound data preview composing a sample of the musical composition data, wherein said sound data preview is generated prior to receiving, from an other music player, a musical composition supply request for said sound data preview;
a cache memory for storing said sound data preview;
a cache status setter for setting a cache status state in response to storing said sound data preview;
a cache status sender for sending the cache status state to said other music player in response to receiving a request for said cache status state from said other music player; and
a sound data preview sender for sending the identification number and the sound data preview to said other music player in response to receiving said musical composition supply request for the sound data preview from the other music player;
a musical composition supply request sending sender sending a second musical composition supply request to a remote music player;
a musical composition data receiver receiving a remote sound data preview from the remote music player in response to the second musical composition supply request; and
a sound data memory storing the remote sound data preview supplied by the remote music player in response to the musical composition supply request.

2. The music player according to claim 1, further comprising a sound data clearing device that clears the sound data preview stored in said cache memory when the playback of the sound data preview is stopped in said player.

3. The music player according to claim 2,
wherein said sound data preview sender is a device that sends a musical composition data identification information identifying the musical composition data, and
the music player further comprising:
a musical composition data identification information sender sending the musical composition data identification information to a distribution device supplying the musical composition data;
the musical composition data receiver receiving the musical composition data related to the musical composition data identification information from the distribution device; and
a sound data clearing device clearing the corresponding sound data preview in said sound data memory when receiving the musical composition data via the musical composition data receiver.

4. The music player according to claim 2 wherein a musical composition data identification information sender sending the identification number for the player along with the musical composition data identification information to a distribution device supplying the musical composition data.

5. The music player according to claim 1,
wherein said sound data preview sender is a device that sends a musical composition data identification information identifying the musical composition data, and
the music player further comprising:
a musical composition data identification information sender sending the musical composition data identification information to a distribution device supplying the musical composition data;
the musical composition data receiver receiving the musical composition data related to the musical composition data identification information from the distribution device; and
a sound data clearing device clearing the corresponding sound data preview in said sound data memory when receiving the musical composition data via the musical composition data receiver.

6. A computer program containing program instructions residing on a non-transitory computer readable storage medium which controls a music player with an identification number memory storing a unique identification number, a musical composition data memory storing one or more musical composition data and a player reading out and playing back the musical composition data, and causing said computer to execute:
a process of generating a sound data preview during playback of the musical composition data by the player, said sound data preview comprising a sample of the musical composition data, wherein said sound data preview is generated prior to receiving a first musical composition supply request for the sound data preview from an other music player;
a process of storing, into a cache memory, said sound data preview;
a process of setting a cache status state in response to storing said sound data preview;
a process of sending the cache status state to said other music player in response to receiving a request for said cache status state from said other music player;
a sound data preview sending process of sending the identification number and the sound data preview to the other music player in response to receiving said first musical composition supply request for the sound data preview from the other music player;
a musical composition supply request sending process of sending a second musical composition supply request to the other music player;
a musical composition data receiver process receiving a remote sound data preview from the other music player in response to the second musical composition supply request; and
a sound data storing process of storing the sound data preview supplied from the other music player in response to the second musical composition supply request.

7. A method for sharing musical composition data amongst music players, comprising:
storing musical composition data in a memory of a first music player;
generating a sound data preview of the musical composition data during playback of the musical composition data by the first music player, said sound data preview composing a sample of the musical composition data, wherein said sound data preview is generated prior to receiving, from a second music player, a musical composition supply request for said sound data preview;
storing said sound data preview at the first music player;

setting a cache status state in response to storing said sound data preview;

sending the cache status state to said second music player in response to receiving a request for said cache status state from said second music player;

sending said musical composition supply request from said second music player to the first music player for said sound data preview;

sending a unique identification number and said sound data preview from the first music player to the second music player in response to the musical composition supply request; and storing the sound data preview received at the second music player in a memory of the second music player.

8. The method of claim 7 further comprises storing the sound data preview in a cache memory during the playback of the musical composition data and deleting the sound data preview from the cache memory when the playback of the musical composition data is stopped.

9. The method of claim 8 further comprises:

sending a musical composition data identification information identifying the musical composition data from the second music player to a distribution device;

receiving the musical composition data at the second musical player from the distribution device; and deleting the sound data preview in the memory of the second music player upon receipt of the musical composition data.

10. The method of claim 7 further comprises:

sending a musical composition data identification information identifying the musical composition data from the second music player to a distribution device;

receiving the musical composition data at the second musical player from the distribution device; and deleting the sound data preview in the memory of the second music player upon receipt of the musical composition data.

* * * * *